United States Patent
Surjaatmadja et al.

(10) Patent No.: US 10,677,380 B1
(45) Date of Patent: Jun. 9, 2020

(54) FAIL SAFE SUCTION HOSE FOR SIGNIFICANTLY MOVING SUCTION PORT

(71) Applicant: Halliburton Energy Services, Inc., Houston, TX (US)

(72) Inventors: Jim Basuki Surjaatmadja, Duncan, OK (US); Timothy H. Hunter, Duncan, OK (US); Justin Lee Hurst, Healdton, OK (US); David Mark Stribling, Duncan, OK (US); Stan V. Stephenson, Duncan, OK (US); Joseph A. Beisel, Duncan, OK (US); Thomas M. Logan, Norman, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/522,874

(22) Filed: Jul. 26, 2019

(51) Int. Cl.
| | |
|---|---|
| *F16L 11/20* | (2006.01) |
| *G01M 3/38* | (2006.01) |
| *F04B 15/00* | (2006.01) |
| *E21B 21/00* | (2006.01) |
| *G01M 3/04* | (2006.01) |
| *E21B 41/00* | (2006.01) |

(52) U.S. Cl.
CPC .............. *F16L 11/20* (2013.01); *E21B 21/00* (2013.01); *E21B 41/00* (2013.01); *F04B 15/00* (2013.01); *G01M 3/042* (2013.01); *G01M 3/38* (2013.01)

(58) Field of Classification Search
CPC .................................. F15L 11/20; G01M 3/38
USPC .............................................. 73/40.5 R, 49.5
See application file for complete search history.

(56) References Cited

U.S. PATENT DOCUMENTS

| | | | | |
|---|---|---|---|---|
| 2,567,496 | A | * 9/1951 | Pittenger | B05B 9/0426 92/110 |
| 3,299,417 | A | * 1/1967 | Sibthorpe | F16L 9/18 340/605 |
| 3,459,363 | A | 8/1969 | Miller | |
| 3,516,434 | A | 6/1970 | Noss | |
| 3,664,371 | A | 5/1972 | Schneider | |
| 4,257,426 | A | * 3/1981 | Bailey | A61B 5/15003 600/578 |
| 4,341,235 | A | * 7/1982 | Nord | F16L 39/02 137/312 |
| 4,784,588 | A | 11/1988 | Miyashita et al. | |

(Continued)

FOREIGN PATENT DOCUMENTS

| | | |
|---|---|---|
| EP | 0580196 A1 | 1/1994 |
| JP | 2015078838 A | 4/2015 |

OTHER PUBLICATIONS

Scully Intellicheck2, Rev B (Year: 2014).*

(Continued)

*Primary Examiner* — John Fitzgerald
(74) *Attorney, Agent, or Firm* — Conley Rose, P.C.; Rodney B. Carroll

(57) ABSTRACT

A hose assembly for a pump comprising a pressurized hose, wherein the pressurized hose is exposed to pressure during at least a part of the operation of the pump, and a leak detection system comprising an outer hose concentrically positioned about at least a portion of the pressurized hose such that an annular chamber exists between the pressurized hose and the outer hose, whereby a leak of the pressurized hose can be detected by monitoring the hose assembly and/or a leak sensor associated therewith.

20 Claims, 7 Drawing Sheets

(56) References Cited

U.S. PATENT DOCUMENTS

| | | | |
|---|---|---|---|
| 4,850,392 A | 7/1989 | Crump et al. | |
| 4,939,923 A * | 7/1990 | Sharp | F16L 39/00 285/373 |
| 5,040,408 A * | 8/1991 | Webb | F17D 5/04 73/40.5 R |
| 5,072,622 A * | 12/1991 | Roach | F16L 58/1036 73/40.5 R |
| 5,176,025 A * | 1/1993 | Butts | G01M 3/045 73/40.5 R |
| 5,297,896 A | 3/1994 | Webb | |
| 5,343,738 A * | 9/1994 | Skaggs | F16L 11/121 138/113 |
| 5,403,168 A | 4/1995 | Evenson | |
| 5,720,325 A * | 2/1998 | Grantham | B67D 7/0478 138/113 |
| 5,775,842 A | 7/1998 | Osborne | |
| 5,924,853 A | 7/1999 | Pacht | |
| 6,032,699 A * | 3/2000 | Cochran | B67D 7/3209 138/104 |
| 6,082,392 A * | 7/2000 | Watkins, Jr. | B67D 7/002 137/312 |
| 6,164,188 A | 12/2000 | Miser | |
| 6,270,327 B1 * | 8/2001 | Wolz | F04B 33/005 417/547 |
| 6,342,272 B1 | 1/2002 | Halliwell | |
| 6,607,010 B1 * | 8/2003 | Kashy | D04C 1/02 138/121 |
| 6,935,161 B2 * | 8/2005 | Hutchinson | B67D 7/3209 73/40.5 R |
| 7,798,165 B2 * | 9/2010 | McClung, Jr. | F16K 17/34 137/312 |
| 8,234,911 B2 * | 8/2012 | Jax | G01M 3/222 73/40.7 |
| 8,366,408 B2 | 2/2013 | Wago et al. | |
| 8,418,363 B2 | 4/2013 | Patel | |
| 8,506,262 B2 | 8/2013 | Leugemors et al. | |
| 8,550,102 B2 | 10/2013 | Small | |
| 8,590,614 B2 | 11/2013 | Surjaatmadja et al. | |
| 9,499,895 B2 | 11/2016 | Langan et al. | |
| 9,528,508 B2 | 12/2016 | Thomeer et al. | |
| 9,617,654 B2 | 4/2017 | Rajagopalan et al. | |
| 9,822,894 B2 | 11/2017 | Bayyouk et al. | |
| 2007/0044848 A1 | 3/2007 | Norman | |
| 2007/0267076 A1 | 11/2007 | Strauss et al. | |
| 2008/0011057 A1 * | 1/2008 | Spaolonzi | G01M 3/047 73/40 |
| 2009/0041588 A1 | 2/2009 | Hunter et al. | |
| 2009/0041596 A1 | 2/2009 | Ponomarev et al. | |
| 2009/0159133 A1 | 6/2009 | Popke et al. | |
| 2009/0194174 A1 | 8/2009 | Morgan et al. | |
| 2009/0278069 A1 | 11/2009 | Blanco et al. | |
| 2010/0098568 A1 | 4/2010 | Marica | |
| 2010/0126250 A1 * | 5/2010 | Jax | G01M 3/222 73/40.5 R |
| 2011/0180740 A1 | 7/2011 | Marica | |
| 2012/0148431 A1 | 6/2012 | Gabriel | |
| 2012/0223267 A1 | 9/2012 | Marica | |
| 2012/0279721 A1 * | 11/2012 | Surjaatmadja et al. | F04B 15/02 166/369 |
| 2012/0312402 A1 | 12/2012 | Tyler | |
| 2013/0061942 A1 | 3/2013 | Hulsey | |
| 2013/0319220 A1 | 12/2013 | Lahuraka et al. | |
| 2014/0064996 A1 | 3/2014 | Arima | |
| 2014/0150889 A1 | 6/2014 | Ragner | |
| 2014/0261790 A1 | 9/2014 | Marica | |
| 2014/0312257 A1 | 10/2014 | Marica | |
| 2014/0328701 A1 | 11/2014 | Nathan | |
| 2014/0348677 A1 | 11/2014 | Moeller et al. | |
| 2015/0132157 A1 | 5/2015 | Whaley et al. | |
| 2016/0131264 A1 | 5/2016 | Bregazzi et al. | |
| 2016/0215588 A1 | 7/2016 | Belshan et al. | |
| 2018/0058431 A1 | 3/2018 | Blume | |
| 2018/0058444 A1 | 3/2018 | Blume | |
| 2018/0298894 A1 | 10/2018 | Wagner et al. | |
| 2019/0120389 A1 | 4/2019 | Foster et al. | |
| 2019/0226475 A1 | 7/2019 | Stark et al. | |

OTHER PUBLICATIONS

Scully Intellicheck2 (Year: 2013).*
Scully Intellicheck3 (Year: 2016).*
Foreign Communication from Related Application—International Search Report and Written Opinion of the International Searching Authority, International Application No. PCT/US2019/044194, dated Apr. 23, 2020, 12 pages.

* cited by examiner

FAIL SAFE SUCTION HOSE FOR SIGNIFICANTLY MOVING SUCTION PORT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates generally to a method and apparatus for supplying pressurized fluids. More particularly, the present disclosure relates to methods and reciprocating devices for pumping fluids into a wellbore.

BACKGROUND

Pumps, such as high-pressure pumps, having reciprocating elements such as plungers or pistons are commonly employed in oil and gas production fields for operations such as drilling and well servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, many considerations are generally taken into account when designing a pump for use in oil and gas operations. As fluids pumped by such pumps often contain environmentally undesirable fluids, the pumps are designed for operation without leaks.

Accordingly, it is desirable to provide a pump that prevents leaking of fluid from a suction hose into the environment, even when the suction hose develops a leak, and provides an alarm system for detecting the leak before fluid leaks into the environment.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a hose assembly that can be utilized when pumping pressurized fluids. The hose assembly comprises a pressurized hose, wherein the pressurized hose is exposed to pressure during at least a part of the operation of a pump comprising the hose assembly; and a leak detection system. The leak detection system comprises an outer hose concentrically positioned about at least a portion of the pressurized hose (also referred to herein as the "inner hose") such that an annular chamber exists between the pressurized hose and the outer hose, whereby a leak of the pressurized hose can be detected by monitoring the hose assembly and/or a leak sensor associated therewith. The hose assembly of this disclosure thus comprises a layered construction, whereby fluid leaking from the inner layer (e.g., the pressurized hose) can be retained by an annular chamber between the inner layer (e.g., the pressurized hose) and the outer layer (e.g., the outer hose), and the leak detected before fluid leaks to the environment outside the hose assembly. As fluids delivered by the hose assembly can be hazardous and/or not environmentally friendly, utilization of the fail safe hose assembly of this disclosure can provide for safer and/or more cost efficient operation of a pump comprising the hose assembly.

In embodiments, the pressurized hose of the hose assembly can comprise a suction hose (e.g., a pressurized suction hose) that is utilized to provide fluid from a suction manifold to a reciprocating apparatus of a reciprocating pump for pumping pressurized fluid. The hose assembly is designed to prevent a fluid from leaking from the pressurized (e.g., inner hose) of the hose assembly (e.g., the suction hose) into the surrounding environment. In embodiments, the reciprocating apparatus comprises a pump having a pump fluid end with a reciprocating element disposed at least partially within a reciprocating element bore of the pump fluid end; a discharge valve assembly; a suction valve assembly coupled with a front end of the reciprocating element; and the hose assembly. In embodiments, the hose assembly comprises a suction hose fluidly connecting the reciprocating element with a suction intake manifold. In embodiments, the reciprocating apparatus is a high-pressure pump configured to operate at a pressure greater than or equal to about 3,000 psi and/or in a well servicing operation and environment.

Figure 1:
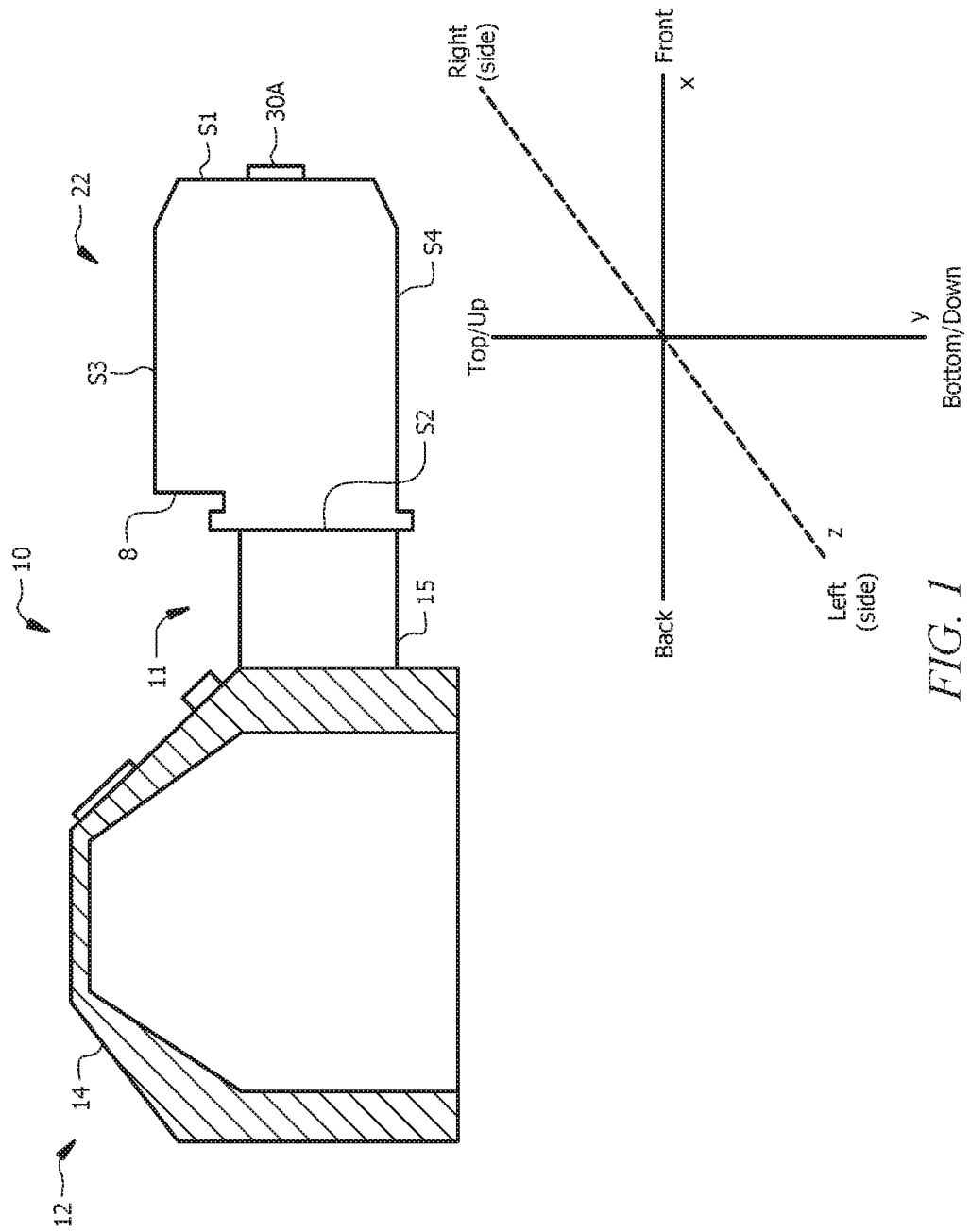
FIG. 1 is an elevational view of a reciprocating pump, according to embodiments of this disclosure.

A reciprocating apparatus of this disclosure may comprise any suitable pump operable to pump fluid. Non-limiting examples of suitable pumps include, but are not limited to, piston pumps, plunger pumps, and the like. In embodiments, the pump is a rotary- or reciprocating-type pump such as a positive displacement pump operable to displace pressurized fluid. The pump comprises a pump power end, a pump fluid end, and an integration section whereby a reciprocating element (e.g., a plunger) can be mechanically connected with the pump power end such that the reciprocating element can be reciprocated within a reciprocating element bore of the pump fluid end. FIG. 1 is an elevational view (e.g., side view) of a pump 10 (e.g., a reciprocating pump) according to an exemplary embodiment, the reciprocating pump comprising a pump power end 12, a pump fluid end 22, and an integration section 11. As illustrated in FIG. 1, pump fluid end has a front S1 opposite a back S2 along a first or x-axis, a top S3 opposite a bottom S4 along a second or y-axis, wherein the y-axis is in the same plane as and perpendicular to the x-axis, and a left side and a right side along a z-axis, wherein the z-axis is along a plane perpendicular to the plane of the x-axis and the y-axis. Accordingly, toward the top of pump fluid end 22 (and pump 10) is along the y-axis toward top S3, toward the bottom of pump fluid end 22 (and pump 10) is along the y-axis toward bottom S4, toward the front of pump fluid end 22 (and pump 10) is along the x-axis toward front S1, and toward the back of pump fluid end 22 (and pump 10) is along the x-axis away from front S1.

Figure 2A:
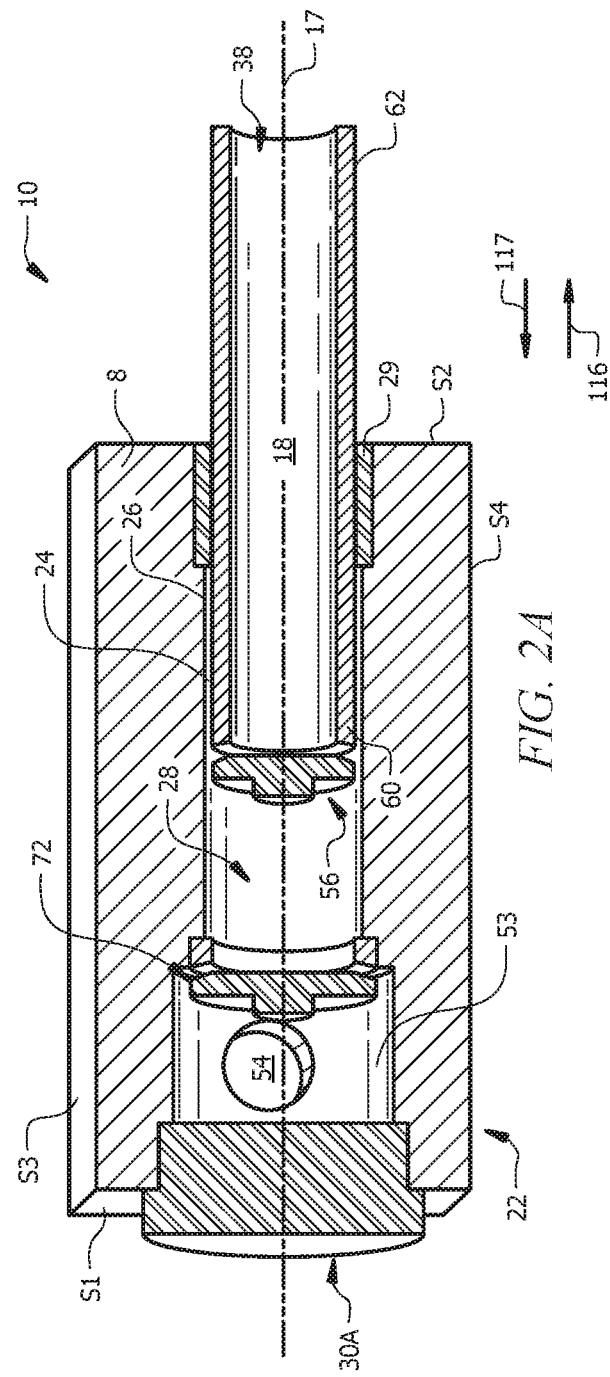
FIG. 2A is a cut-away illustration of an exemplary reciprocating pump comprising a concentric bore pump fluid end, according to embodiments of the present disclosure.
Figure 2B:
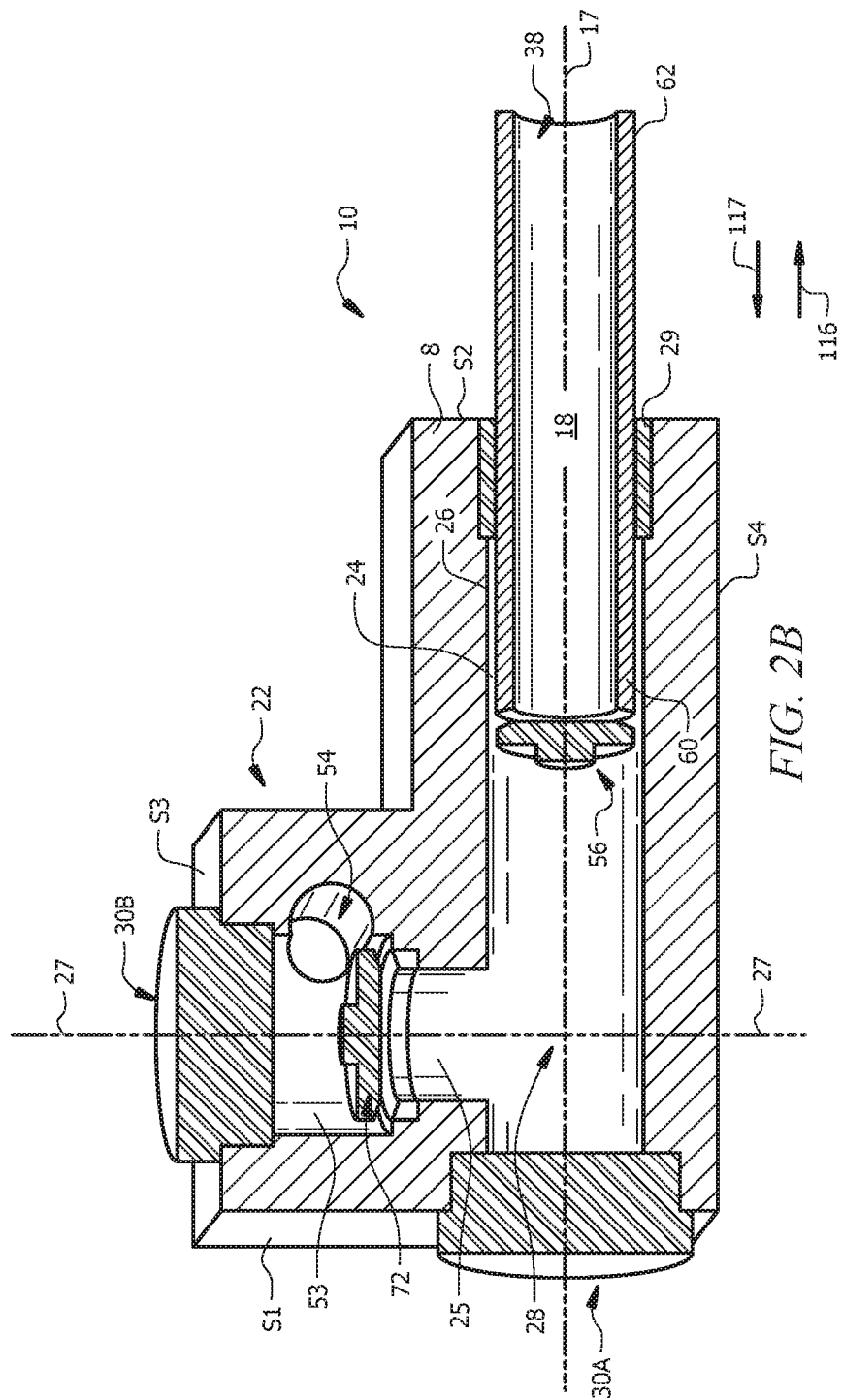
FIG. 2B is a cut-away illustration of an exemplary reciprocating pump comprising a cross-bore (e.g., a tee-bore ("T-bore")) pump fluid end, according to embodiments of the present disclosure.

The pump fluid end 22 is integrated with the pump power end 12 via the integration section 11, such that pump power end 12 is operable to reciprocate the reciprocating element 18 within a reciprocating element bore 24 (FIG. 2A/FIG. 2B) of the pump fluid end 22. The reciprocating element bore 24 is at least partially defined by a cylinder wall 26. As described further hereinbelow with reference to FIG. 2A, pump fluid end 22 of this disclosure can be an in-line or "concentric" bore pump fluid end. In alternative embodiments, described further hereinbelow with reference to FIG. 2B, pump fluid end 22 is a "cross-bore" pump fluid end 22 (also referred to herein as a multi-bore pump fluid end), which, as utilized herein, can include "T-bore" pump fluid ends, "X-bore" (e.g., cross shaped bore) pump fluid ends, or "Y-bore" pump fluid ends. FIG. 2A is a schematic showing a concentric bore pump fluid end 22 engaged with a reciprocating element 18. FIG. 2B is a schematic showing a tee-bore pump fluid end 22 engaged with a reciprocating element 18. In a tee-bore pump fluid end 22, reciprocating element bore 24 and tee-bore 25 are perpendicular, making the shape of a "T". As discussed further below, the pump 10 includes at least one fluid inlet 38 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like.

The pump 10 may comprise any suitable pump power end 12 for enabling the pump 10 to perform pumping operations (e.g., pumping a wellbore servicing fluid downhole). Similarly, the pump 10 may include any suitable housing 14 for containing and/or supporting the pump power end 12 and components thereof. The housing 14 may comprise various combinations of inlets, outlets, channels, and the like for circulating and/or transferring fluid. Additionally, the housing 14 may include connections to other components and/or systems, such as, but not limited to, pipes, tanks, drive mechanisms, etc. Furthermore, the housing 14 may be configured with cover plates or entryways for permitting access to the pump power end 12 and/or other pump components. As such, the pump 10 may be inspected to determine whether parts need to be repaired or replaced. The pump power end may also be hydraulically driven, whether it is a non-intensifying or an intensifying system.

Figure 3:
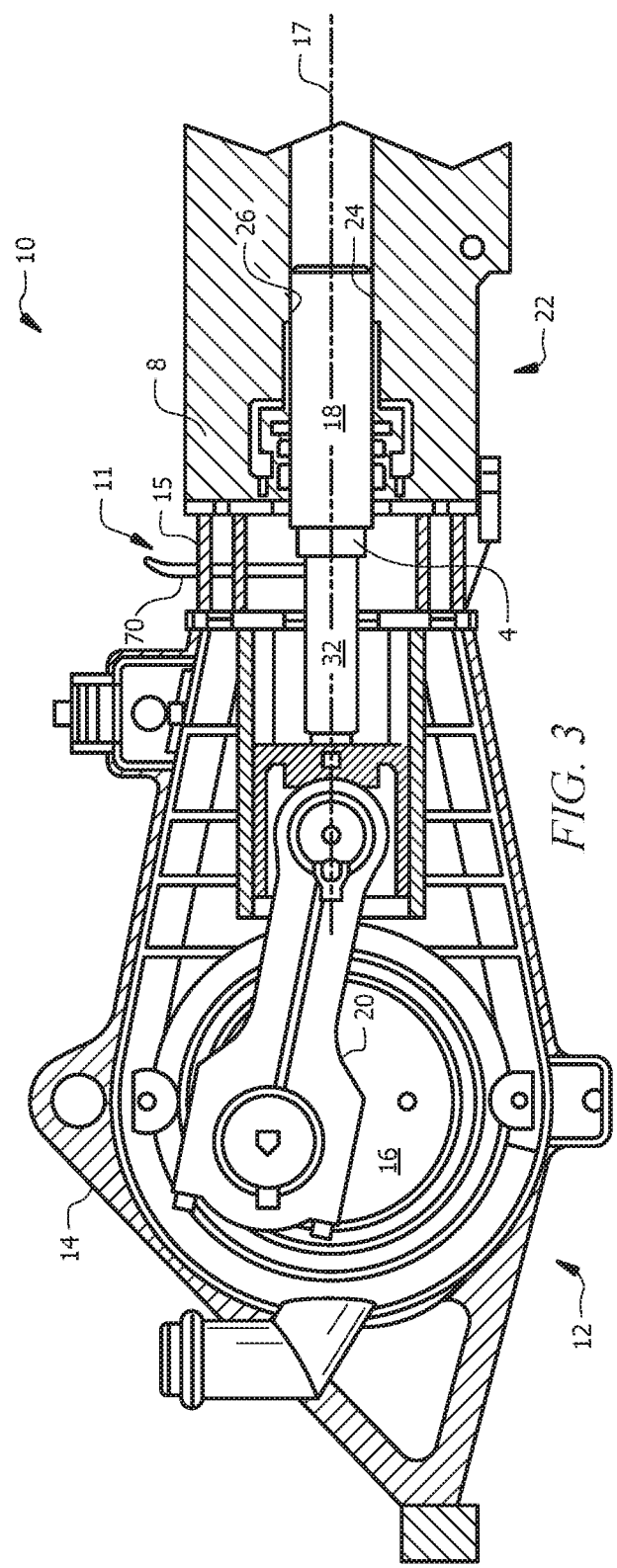
FIG. 3 is cut-away illustration of a pump power end of a pump, according to embodiments of the present disclosure.

Those versed in the art will understand that the pump power end 12 may include various components commonly employed in pumps. Pump power end 12 can be any suitable pump known in the art and with the help of this disclosure to be operable to reciprocate reciprocating element 18 in reciprocating element bore 24. For example, without limitation, pump power end 12 can be operable via and comprise a crank and slider mechanism, a powered hydraulic/pneumatic/steam cylinder mechanism or various electric, mechanical or electro-mechanical drives. FIG. 3 provides a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 attached to at least one reciprocating element 18 (e.g., a plunger or piston) by way of a crank arm 20 and pushrod 30. Additionally, an engine (e.g., a diesel engine), motor, or other suitable power source may be operatively connected to the crankshaft 16 (e.g., through a transmission and drive shaft) and operable to actuate rotation thereof. In operation, rotation of the crankshaft 16 induces translational movement of the crank arm rod 20, thereby causing the reciprocating element 18 to extend and retract along a flow path, which may generally be defined by a central axis 17 within a reciprocating element bore 24 (sometimes referred to herein for brevity as a "reciprocating element bore 24" or simply a "bore 24", and not wishing to be limited to a particular reciprocating element 18). Pump 10 of FIG. 1 is typically mounted on a movable structure such as a semi-tractor trailer or skid, and the moveable structure may contain additional components, such as a motor or engine (e.g., a diesel engine), that provides power (e.g., mechanical motion) to the pump power end 12 (e.g., a crankcase comprising crankshaft 16 and related connecting rods 20).

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1 are well known and understood, discussion of the pump 10 will herein be limited to the extent necessary for enabling a proper understanding of the disclosed embodiments.

As noted hereinabove, the pump 10 comprises a pump fluid end 22 attached to the pump power end 12. Various embodiments of the pump fluid end 22 are described in detail below in connection with other drawings, for example FIG. 2A and FIG. 2B. Generally, the pump fluid end 22 comprises at least one fluid inlet 38 for receiving fluid, and at least one discharge outlet 54 through which fluid flows out of the discharge chamber 53. The pump fluid end 22 also comprises at least one valve assembly for controlling the receipt and output of fluid. For example, the pump fluid end 22 can comprise a suction valve assembly 56 and a discharge valve assembly 72. The pump fluid end 22 may include any suitable component(s) and/or structure(s) for containing and/or supporting the reciprocating element 18 and providing a cylinder wall 26 at least partially defining a reciprocating element bore 24 along which the pump power end can reciprocate the reciprocating element during operation of the pump.

In embodiments, the pump fluid end 22 may comprise a cylinder wall 26 at least partially defining a bore 24 through which the reciprocating element 18 may extend and retract. Additionally, the bore 24 may be in fluid communication with a discharge chamber 53 formed within the pump fluid end 22. Such a discharge chamber 53, for example, may be configured as a pressurized discharge chamber 53 having a discharge outlet 54 through which fluid is discharged by the reciprocating element 18. Thus, the reciprocating element 18 may be movably disposed within the reciprocating element bore 24, which may provide a fluid flow path into and/or out of the pump chamber. During operation of the pump 10, the reciprocating element 18 may be configured to reciprocate along a path (e.g., along central axis 17 within bore 24 and/or pump chamber 28, which corresponds to reciprocal movement parallel to the x-axis of FIG. 1) to transfer a supply of fluid to the pump chamber 28 and/or discharge fluid from the pump chamber 28.

In operation, the reciprocating element 18 extends and retracts along a flow path to alternate between providing forward strokes (also referred to as discharge strokes and correlating to movement in a positive direction parallel to the x-axis of FIG. 1 and indicated by arrow 117 of FIG. 2A and FIG. 2B) and return strokes (also referred to as suction strokes and correlating to movement in a negative direction parallel to the x-axis of FIG. 1 and indicated by arrow 116 in FIG. 2A and FIG. 2B), respectively. During a forward stroke, the reciprocating element 18 extends away from the pump power end 12 and toward the pump fluid end 22. Before the forward stoke begins, the reciprocating element 18 is in a fully retracted position (also referred to as bottom dead center (BDC) with reference to the crankshaft 16), in which case the suction valve assembly 56 can be in a closed configuration having allowed fluid to flow into the (e.g., high pressure) pump chamber 28. When discharge valve assembly 72 is in a closed configuration (e.g., under the influence of a closing mechanism, such as a spring, the high pressure in a discharge pipe or manifold containing discharge outlet 54) prevents fluid flow into discharge chamber 53 and causes pressure in the pump chamber 28 to accumulate upon stroking of the reciprocating element 18. When the reciprocating element 18 begins the forward or discharge stroke, the pressure builds inside the pump chamber 28 and acts as an opening force that results in positioning of the discharge valve assembly 72 in an open configuration, while a closing force (e.g., via a closing mechanism, such as a spring and/or pressure increase inside pump chamber 28) urges the suction valve assembly 56 into a closed configuration. When utilized in connection with a valve assembly, 'open' and 'closed' refer, respectively, to a configuration in which fluid can flow through the valve assembly (e.g., can pass between a valve body (e.g., a movable poppet) and a valve seat thereof) and a configuration in which fluid cannot flow through the valve assembly (e.g., cannot pass between a valve body (e.g., a movable poppet) and a valve seat thereof). As the reciprocating element 18 extends forward, fluid within the pump chamber 28 is discharged through the discharge outlet 54.

During a return or suction stroke, the reciprocating element 18 reciprocates or retracts away from the pump fluid end 22 and towards the pump power end 12 of the pump 10. Before the return stroke begins, the reciprocating element 18 is in a fully extended position (also referred to as top dead center (TDC) with reference to the crankshaft 16), in which case the discharge valve assembly 72 can be in a closed configuration having allowed fluid to flow out of the pump chamber 28 and the suction valve assembly 56 is in a closed configuration. When the reciprocating element 18 begins and retracts towards the pump power end 12, the discharge valve assembly 72 assumes a closed configuration, while the suction valve assembly 56 opens. As the reciprocating element 18 moves away from the discharge valve 72 during a return stroke, fluid flows through the suction valve assembly 56 and into the pump chamber 28.

With reference to the embodiment of FIG. 2A, which is a schematic showing a concentric pump fluid end 22 engaged with a reciprocating element 18, concentric bore pump fluid end 22 comprises a concentric bore fluid end body 8, a concentric pump chamber 28, a suction valve assembly 56, and a discharge valve assembly 72. In this concentric bore configuration of FIG. 2A, suction valve assembly 56 and discharge valve assembly 72 are positioned in-line (also referred to as coaxial) with reciprocating element bore 24, i.e., central axis 17 of reciprocating element bore 24 is also the central axis of suction pump assembly 56 and discharge valve assembly 72). With reference to the embodiment of FIG. 2B, which is a schematic showing a T-bore pump fluid end 22 engaged with a reciprocating element 18, T-bore pump fluid end 22 comprises a T-bore fluid end body 8, a T-shaped pump chamber 28, a suction valve assembly 56, and a discharge valve assembly 72. In this T-bore configuration of FIG. 2B, suction valve assembly 56 is coupled with front end 60 of reciprocating element 18 and discharge valve assembly 72 is positioned in bore 25 that makes a tee with reciprocating element bore 24, i.e., central axis 17 of reciprocating element bore 24 is also the central axis of suction pump assembly 56 and perpendicular to a central axis 27 of discharge valve assembly 72).

Suction valve assembly 56 and discharge valve assembly 72 are operable to direct fluid flow within the pump 10. In pump fluid end 22 designs of this disclosure, fluid flows within a hollow reciprocating element (e.g., a hollow plunger) 18 via fluid inlet 38 located toward tail end 62 of reciprocating element 18. The reciprocating element bore 24 of such a fluid end design can be defined by a high pressure cylinder or cylinder wall 26 providing a high pressure chamber. (As utilized here, "high pressure" indicates possible subjection to high pressure during discharge.) When reciprocating element 18 retracts, or moves along central axis 17 in a direction away from the pump chamber 28 and pump fluid end 22 and toward pump power end 12 (as indicated by arrow 116), a suction valve of the suction valve assembly 56 opens (e.g., either under natural flow and/or other biasing means), and a discharge valve of discharge valve assembly 72 will be closed, whereby fluid enters pump chamber 28 via a fluid inlet 38. For a pump fluid end 22 design of this disclosure, the fluid inlet 38 is configured to introduce fluid into pump chamber 28 via a reciprocating element 18 that is hollow. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge chamber 53 and discharge outlet 54.

A pump 10 of this disclosure can comprise one or more access ports. With reference to the concentric fluid end body 8 embodiment of FIG. 2A, a front access port 30A can be located on a front S1 of the pump fluid end 22 opposite a back S2 of the pump fluid end 22, wherein the back S2 of the pump fluid end is proximal the pump power end 12, upon integration therewith via integration section 11. With reference to the T-bore fluid end body 8 embodiment of FIG. 2B, a front access port 30A can be located on a front S1 of the pump fluid end 22 opposite a back S2 of the pump fluid end 22, wherein the back S2 of the pump fluid end is proximal the pump power end 12, upon integration therewith via integration section 11, and a top access port 30B can be located on a top S3 of the pump fluid end 22 opposite a bottom S4 of pump fluid end 22. Locations described as front S1, back S2, top S3, and bottom S4 are further described with reference to the x-y-z coordinate system shown in FIG. 1 and further can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to size and positioning of pump 10, the front S1 and top S3 of the pump fluid end 22 are more easily accessible than a back S2 or bottom S4 thereof. In a similar manner, a front of pump 10 is distal the pump power end 12 and a back of the pump 10 is distal the pump fluid end 22. The integration section 11 can be positioned in a space between the pump fluid end 22 and the pump power end 12, and can be safeguarded (e.g., from personnel) via a cover 15.

In embodiments, a pump fluid end 22 and pump 10 of this disclosure comprise at least one access port. In embodiments, the at least one access port is located on a side of the discharge valve assembly 72 opposite the suction valve assembly 56. For example, in the concentric bore pump fluid end 22 embodiment of FIG. 2A, front access port 30A is located on a side (e.g., front side) of discharge valve assembly 72 opposite suction valve assembly 56. In the T-bore pump fluid end 22 embodiment of FIG. 2B, front access port 30A is located on top S3 of pump fluid end 22.

In embodiments, one or more seals 29 (e.g., "o-ring" seals, packing seals, or the like), also referred to herein as 'primary' reciprocating element packing 29 (or simply "packing 29") may be arranged around the reciprocating element 18 to provide sealing between the outer walls of the reciprocating element 18 and the inner walls 26 defining at least a portion of the reciprocating element bore 24. The inner walls 26 can be provided by pump fluid end body 8 or a sleeve such as described hereinbelow. In fluid end designs such as described herein operated with a hollow reciprocating element 18, a second set of seals (also referred to herein as 'secondary' reciprocating element packing; not shown in the Figures) is conventionally arranged around the reciprocating element 18 to provide sealing between the outer walls of the reciprocating element 18 and the inner walls of a low-pressure cylinder that defines a low pressure fluid chamber (e.g., wherein the secondary packing is farther back along the x-axis and delineates a back end of a low pressure chamber that extends from the primary packing 29 to the secondary packing). According to this disclosure, only a primary reciprocating element packing 29 is utilized, as fluid enters tail end 62 of reciprocating element 18 without first contacting an outer peripheral wall thereof (i.e., no secondary reciprocating element packing is needed/utilized, because no low pressure chamber external to reciprocating element 18 is utilized). Skilled artisans will recognize that the seals of the primary packing may comprise any suitable type of seals, and the selection of seals may depend on various factors e.g., fluid, temperature, pressure, etc.

While the foregoing discussion focused on a pump fluid end 22 comprising a single reciprocating element 18 disposed in a single reciprocating element bore 24, it is to be understood that the pump fluid end 22 may include any suitable number of reciprocating elements. As discussed further below, for example, the pump 10 may comprise a plurality of reciprocating elements 18 and associated reciprocating element bores 24 arranged in parallel and spaced apart along the z-axis of FIG. 1 (or another arrangement such as a V block or radial arrangement). In such a multi-bore pump, each reciprocating element bore may be associated with a respective reciprocating element and crank arm, and a single common crankshaft may drive each of the plurality of reciprocating elements and crank arms. Alternatively, a multi-bore pump may include multiple crankshafts, such that each crankshaft may drive a corresponding reciprocating element. Furthermore, the pump 10 may be implemented as any suitable type of multi-bore pump. In a non-limiting example, the pump 10 may comprise a Triplex pump having three reciprocating elements 18 (e.g., plungers or pistons) and associated reciprocating element bores 24, discharge valve assemblies 72 and suction valve assemblies 56, or a Quintuplex pump having five reciprocating elements 18 and five associated reciprocating element bores 24, discharge valve assemblies 72 and suction valve assemblies 56.

Reciprocating element bore 24 can have an inner diameter slightly greater than the outer diameter of the reciprocating element 18, such that the reciprocating element 18 may sufficiently reciprocate within reciprocating element bore 24 (optionally within a sleeve as described herein). In embodiments, the fluid end body 8 of pump fluid end 22 has a pressure rating ranging from about 100 psi to about 3000 psi, or from about 2000 psi to about 10,000 psi, from about 5000 psi to about 30,000 psi, or from about 3000 psi to about 50,000 psi or greater. The fluid end body 8 of pump fluid end 22 may be cast, forged or formed from any suitable materials, e.g., steel, metal alloys, or the like. Those versed in the art will recognize that the type and condition of material(s) suitable for the fluid end body 8 may be selected based on various factors. In a wellbore servicing operation, for example, the selection of a material may depend on flow rates, pressure rates, wellbore service fluid types (e.g., particulate type and/or concentration present in particle laden fluids such as fracturing fluids or drilling fluids, or fluids comprising cryogenic/foams), etc. Moreover, the fluid end body 8 (e.g., cylinder wall 26 defining at least a portion of reciprocating element bore 24 and/or pump chamber 28) may include protective coatings for preventing and/or resisting abrasion, erosion, and/or corrosion.

In embodiments, the cylindrical shape (e.g., providing cylindrical wall(s) 26) of the fluid end body 8 may be pre-stressed in an initial compression. Moreover, a high-pressure cylinder(s) providing the cylindrical shape (e.g., providing cylindrical wall(s) 26) may comprise one or more sleeves (e.g., heat-shrinkable sleeves). Additionally or alternatively, the high-pressure cylinder(s) may comprise one or more composite overwraps and/or concentric sleeves ("over-sleeves"), such that an outer wrap/sleeve pre-loads an inner wrap/sleeve. The overwraps and/or over-sleeves may be non-metallic (e.g., fiber windings) and/or constructed from relatively lightweight materials. Overwraps and/or over-sleeves may be added to increase fatigue strength and overall reinforcement of the components.

The cylinders and cylindrical-shaped components (e.g., providing cylindrical wall 26) associated with the pump fluid end body 8 of pump fluid end 22 may be held in place within the pump 10 using any appropriate technique. For example, components may be assembled and connected, e.g., bolted, welded, etc. Additionally or alternatively, cylinders may be press-fit (e.g., interference fit) into openings machined or cast into the pump fluid end 22 or other suitable portion of the pump 10. Such openings may be configured to accept and rigidly hold cylinders (e.g., having cylinder wall(s) 26 at least partially defining reciprocating element bore 24) in place so as to facilitate interaction of the reciprocating element 18 and other components associated with the pump 10.

In embodiments, the reciprocating element 18 comprises a plunger or a piston. While the reciprocating element 18 may be described herein with respect to embodiments comprising a plunger, it is to be understood that the reciprocating element 18 may comprise any suitable component for displacing fluid. In a non-limiting example, the reciprocating element 18 may be a piston. As those versed in the art will readily appreciate, a piston-type pump generally employs sealing elements (e.g., rings, packing, etc.) attached to the piston and movable therewith. In contrast, a plunger-type pump generally employs fixed or static seals (e.g., primary seal or packing 29) through which the plunger moves during each stroke (e.g., suction stroke or discharge stroke).

As skilled artisans will understand, the reciprocating element 18 may include any suitable size and/or shape for extending and retracting along a flow path within the pump fluid end 22. For instance, reciprocating element 18 may comprise a generally cylindrical shape, and may be sized such that the reciprocating element 18 can sufficiently slide against or otherwise interact with the inner cylinder wall 26. In embodiments, one or more additional components or mechanical linkages 4 (FIG. 4; e.g., clamps, adapters, extensions, etc.) may be used to couple the reciprocating element 18 to the pump power end 12 (e.g., to a crank arm 20 or pushrod 30).

According to this disclosure, reciprocating element 18 employed in a concentric bore pump fluid end 22 embodiment (such as depicted in FIG. 2A) or a T-bore pump fluid end 22 (such as depicted in FIG. 2B) comprises a peripheral wall 84 defining a hollow body. In embodiments, a portion of the peripheral wall 84 may be generally permeable or may include an input through which fluid may enter the hollow body and an output through which fluid may exit the hollow body. Furthermore, while the reciprocating element 18 may, in embodiments, define a substantially hollow interior and include a ported body, a base of the reciprocating element 18 proximal the pump power end 12, when assembled, may be substantially solid and/or impermeable (e.g., a plunger having both a hollow portion and a solid portion).

The reciprocating element 18 comprises a front or free end 60. According to this disclosure, suction valve assembly 56 is coupled with front end 60 of reciprocating element 18. In embodiments, the reciprocating element 18 can contain or at least partially contain the suction valve assembly 56. In one aspect, the suction valve assembly 56 is at least partially disposed within the reciprocating element 18 at or proximate to the front end 60 thereof. At an opposite or tail end 62 (also referred to as back end 62) of the reciprocating element 18, the reciprocating element 18 may include a base coupled to the pump power end 12 of the pump 10 (e.g., via crank arm 20). In embodiments, the tail end 62 of the reciprocating element 18 is coupled to the pump power end 12 outside of pump fluid end 22, e.g., within integration section 11.

As noted above, pump fluid end 22 contains a suction valve assembly 56. Suction valve assembly 56 may alternately open or close to permit or prevent fluid flow. Skilled artisans will understand that the suction valve assembly 56 may be of any suitable type or configuration (e.g., gravity- or spring-biased, flow activated, etc.). Those versed in the art will understand that the suction valve assembly 56 may be disposed within the pump fluid end 22 at any suitable location therein. For instance, the suction valve assembly 56 may be disposed within reciprocating element bore 24 and at least partially within reciprocating element 18 in concentric bore pump fluid end 22 designs such as FIG. 2A or T-bore pump fluid end 22 designs such as FIG. 2B, such that a suction valve body of the suction valve assembly 56 moves away from a suction valve seat within the a suction valve seat housing of reciprocating element 18 when the suction valve assembly 56 is opening and toward the suction valve seat when the suction valve assembly 56 is closing.

Pump 10 comprises a discharge valve assembly 72 for controlling the output of fluid through discharge chamber 53 and discharge outlet 54. Analogous to the suction valve assembly 56, the discharge valve assembly 72 may alternately open or close to permit or prevent fluid flow. Those versed in the art will understand that the discharge valve assembly 72 may be disposed within the pump chamber at any suitable location therein. For instance, the discharge valve assembly 72 may be disposed proximal the front S1 of bore 24 (e.g., at least partially within discharge chamber 53 and/or pump chamber 28) of the pump fluid end 22, such that a discharge valve body of the discharge valve assembly 72 moves toward the discharge chamber 53 when the discharge valve assembly 72 is in an open configuration and away from the discharge chamber 53 when the discharge valve assembly 72 is in a closed configuration. In addition, in concentric bore pump fluid end 22 configurations such as FIG. 2A, the discharge valve assembly 72 may be co-axially aligned with the suction valve assembly 56 (e.g., along central axis 17), and the suction valve assembly 56 and the discharge valve assembly 72 may be coaxially aligned with the reciprocating element 18 (e.g., along central axis 17). In alternative embodiments, such as the T-bore pump fluid end 22 embodiment of FIG. 2B, discharge valve assembly 72 can be positioned within T-bore 25, at least partially within discharge chamber 53 and/or pump chamber 28, and have a central axis coincident (e.g., coaxial) with central axis 27 of T-bore 25.

Further, the suction valve assembly 56 and the discharge valve assembly 72 can comprise any suitable mechanism for opening and closing valves. For example, the suction valve assembly 56 and the discharge valve assembly 72 can comprise a suction valve spring and a discharge valve spring, respectively. Additionally, any suitable structure (e.g., valve assembly comprising sealing rings, stems, poppets, valve guides, etc.) and/or components may be employed for retaining the components of the suction valve assembly 56 and the components of the discharge valve assembly 72 within the pump fluid end 22.

The pump 10 may comprise and/or be coupled (as detailed further hereinbelow) to any suitable fluid source for supplying fluid to the pump via the fluid inlet 38. In embodiments, the pump 10 may also comprise and/or be coupled to a pressure source such as a boost pump (e.g., a suction boost pump) fluidly connected to the pump 10 (e.g., via inlet 38) and operable to increase or "boost" the pressure of fluid introduced to pump 10 via fluid inlet 38. A boost pump may comprise any suitable type including, but not limited to, a centrifugal pump, a gear pump, a screw pump, a roller pump, a scroll pump, a piston/plunger pump, or any combination thereof. For instance, the pump 10 may comprise and/or be coupled to a boost pump known to operate efficiently in high-volume operations and/or may allow the pumping rate therefrom to be adjusted. Skilled artisans will readily appreciate that the amount of added pressure may depend and/or vary based on factors such as operating conditions, application requirements, etc. In one aspect, the boost pump may have an outlet pressure greater than or equal to about 70 psi, about 80 psi, or about 110 psi, providing fluid to the suction side of pump 10 at about said pressures. Additionally or alternatively, the boost pump may have a flow rate of greater than or equal to about 80 BPM, about 70 BPM, and/or about 50 BPM.

As noted hereinabove, the pump 10 may be implemented as a multi-cylinder pump comprising multiple cylindrical reciprocating element bores 24 and corresponding components. In embodiments, the pump 10 is a Triplex pump in which the pump fluid end 22 comprises three reciprocating assemblies, each reciprocating assembly comprising a suction valve assembly 56, a discharge valve assembly 72, a pump chamber 28, a fluid inlet 38, a discharge outlet 54, and a reciprocating element bore 24 within which a corresponding reciprocating element 18 reciprocates during operation of the pump 10 via connection therewith to a (e.g., common) pump power end 12. In embodiments, the pump 10 is a Quintuplex pump in which the pump fluid end 22 comprises five reciprocating assemblies. In a non-limiting example, the pump 10 may be a Q-10™ Quintuplex Pump or an HT-400™ Triplex Pump, produced by Halliburton Energy Services, Inc.

In embodiments, the pump fluid end 22 may comprise an external or stationary fluid manifold (e.g., a suction header) for feeding fluid to the multiple reciprocating assemblies via any suitable inlet(s). Additionally or alternatively, the pump fluid end 22 may comprise separate conduits such as hoses fluidly connected to separate inlets for inputting fluid to each reciprocating assembly. Of course, numerous other variations may be similarly employed, and therefore, fall within the scope of the present disclosure.

Those skilled in the art will understand that the reciprocating elements of each of the reciprocating assemblies may be operatively connected to the pump power end 12 of the pump 10 according to any suitable manner. For instance, separate connectors (e.g., cranks arms 20, connecting rods, etc.) associated with the pump power end 12 may be coupled to each reciprocating element body or tail end 62. The pump 10 may employ a common crankshaft (e.g., crankshaft 16) or separate crankshafts to drive the multiple reciprocating elements.

As previously discussed, the multiple reciprocating elements may receive a supply of fluid from any suitable fluid source, which may be configured to provide a constant fluid supply. Additionally or alternatively, the pressure of supplied fluid may be increased by adding pressure (e.g., boost pressure) as described previously. In embodiments, the fluid inlet(s) 38 receive a supply of pressurized fluid comprising a pressure ranging from about 30 psi to about 300 psi.

Additionally or alternatively, the one or more discharge outlet(s) 54 may be fluidly connected to a common collection point such as a sump or distribution manifold, which may be configured to collect fluids flowing out of the fluid outlet(s) 54, or another cylinder bank and/or one or more additional pumps.

During pumping, the multiple reciprocating elements 18 will perform forward and returns strokes similarly, as described hereinabove. In embodiments, the multiple reciprocating elements 18 can be angularly offset to ensure that no two reciprocating elements are located at the same position along their respective stroke paths (i.e., the plungers are "out of phase"). For example, the reciprocating elements may be angularly distributed to have a certain offset (e.g., 120 degrees of separation in a Triplex pump) to minimize undesirable effects that may result from multiple reciprocating elements of a single pump simultaneously producing pressure pulses. The position of a reciprocating element is generally based on the number of degrees a pump crankshaft (e.g., crankshaft 16) has rotated from a bottom dead center (BDC) position. The BDC position corresponds to the position of a fully retracted reciprocating element at zero velocity, e.g., just prior to a reciprocating element moving (i.e., in a direction indicated by arrow 117 in FIG. 2A and FIG. 2B) forward in its cylinder. A top dead center position corresponds to the position of a fully extended reciprocating element at zero velocity, e.g., just prior to a reciprocating element moving backward (i.e., in a direction indicated by arrow 116 in FIG. 2A and FIG. 2B) in its cylinder.

As described above, each reciprocating element 18 is operable to draw in fluid during a suction (backward or return) stroke and discharge fluid during a discharge (forward) stroke. Skilled artisans will understand that the multiple reciprocating elements 18 may be angularly offset or phase-shifted to improve fluid intake for each reciprocating element 18. For instance, a phase degree offset (at 360 degrees divided by the number of reciprocating elements) may be employed to ensure the multiple reciprocating elements 18 receive fluid and/or a certain quantity of fluid at all times of operation. In one implementation, the three reciprocating elements 18 of a Triplex pump may be phase-shifted by a 120-degree offset. Accordingly, when one reciprocating element 18 is at its maximum forward stroke position, a second reciprocating element 18 will be 60 degrees through its discharge stroke from BDC, and a third reciprocating element will be 120 degrees through its suction stroke from top dead center (TDC).

Figure 4A:
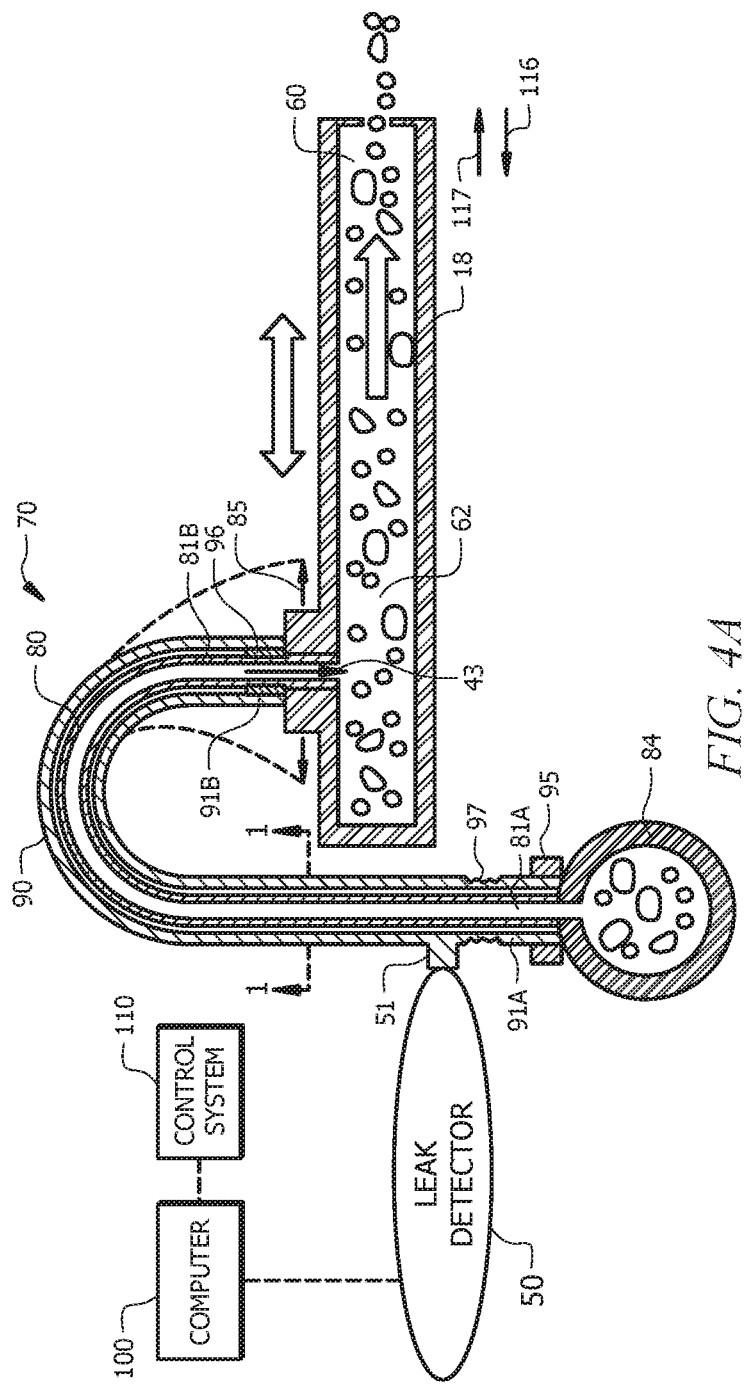
FIG. 4A is a schematic of a hose assembly, according to embodiments of this disclosure, coupled with a reciprocating element.

FIG. 4A is a schematic of a fail safe hose assembly 70 (also referred to herein simply as a "hose assembly" 70) according to embodiments of this disclosure, coupled with a reciprocating element 18. Hose assembly 70 comprises a pressurized hose 80 and a leak detection system. The pressurized hose 80 is exposed to pressure during at least a part of the operation of a pump 10 comprising the hose assembly 70. The leak detection system comprises an outer hose 90 concentrically positioned about at least a portion of the pressurized hose 70 such that an annular chamber exists and/or can be created between the pressurized hose 80 and the outer hose 90, whereby a leak of the pressurized hose 80 can be detected by monitoring the hose assembly 70 and/or a leak sensor 50 associated therewith. Outer hose 90 is not fused with pressurized hose 80 along the entire length thereof, such that the annular chamber between pressurized hose 80 and outer hose 90 can exist in the absence of a leak or can form (or enlarge) should fluid leak from pressurized hose 80 into outer hose 90.

Figure 4B:
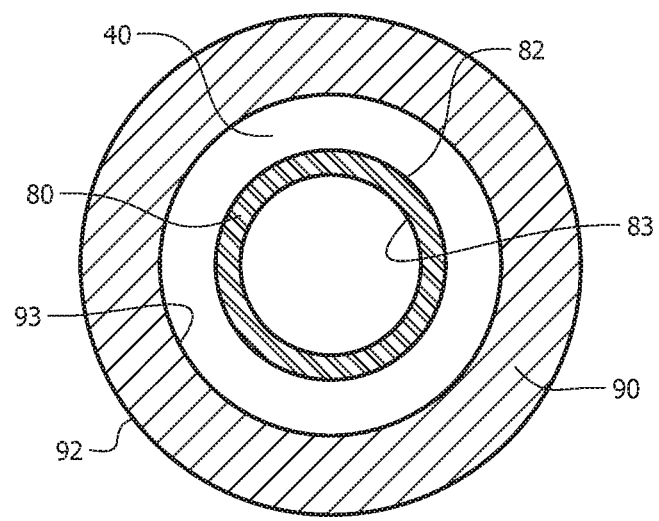
FIG. 4B is a schematic of a cross-section along 1-1 of the hose assembly of FIG. 4A, according to embodiments of this disclosure.

FIG. 4B is a schematic of a cross-section along 1-1 of the hose assembly of FIG. 4A, according to embodiments of this disclosure. As seen in FIG. 4B, at least a portion of the length of pressurized (inner) hose 80 is positioned concentrically within outer hose 90. Outer hose 90 has an outer surface 92 (also referred to herein as an "outer circumference" 92) and an inner surface 93 (also referred to herein as an "inner circumference" 93), and pressurized hose 80 has an outer surface 82 (also referred to herein as an "outer circumference" 82) and an inner surface 83 (also referred to herein as an "inner circumference" 83). Outer hose 90 is concentrically positioned about at least a portion of the pressurized (e.g., suction) hose 80 such that an annular chamber 40 between the pressurized hose 80 and the outer hose 90 can contain a volume of fluid that may leak from the pressurized hose 80, whereby a leak of the pressurized hose can be detected by monitoring the hose assembly 70 and/or a leak sensor 50 associated therewith. Annular chamber 40 may be humanly visible in cross-section as shown in FIG. 4B, or outer surface 82 of pressurized hose 80 may be positioned closely to and/or or may be in contact with inner surface 93 of outer hose 90 such that the annular space 40 is not humanly visible in cross-section. In an aspect, the outer circumference 82 of pressurized hose 80 and the inner circumference 93 of the outer hose 90 are about the same, or alternatively differ by equal to less than 0.5 cm, 0.1 cm, 0.001 cm, or 0.001 cm. In an alternative aspect, the outer circumference 82 of pressurized hose 80 and the inner circumference 93 of the outer hose 90 are not about the same, or alternatively differ by equal to or greater than 0.5 cm, 1 cm, 1.5 cm, 2 cm, 2.5 cm, 3 cm, 4, cm or 5 cm.

In embodiments, the outer hose 90 of the hose assembly 70 is elastic, such that a leak of the pressurized hose 80 can be detected by visual observation of the outer hose 90. In such embodiments, should pressurized inner hose 80 develop a leak, fluid will leak from within pressurized hose 80 and be contained by the annular chamber 40 that exists and/or forms or enlarges between outer surface 82 of pressurized hose 80 and inner surface 93 of outer hose 90. For example, in embodiments, no annular chamber 40 exists prior to a leak (e.g., the outer surface 82 of pressured hose 80 is in contact with, but not fused to, the inner surface 93 of outer hose 90), but expansion of the (e.g., elastic) outer hose 90 upon leaking of a fluid from the pressurized hose 80 creates annular chamber 40, whereby the leaking fluid is contained within the hose assembly 70. Alternatively, as noted hereinabove, annular chamber 40 can exist even in the absence of a leak. In some such embodiments, a volume of the annular chamber 40 may increase (e.g., as outer hose 90 expands, swells, balloons, etc.) when fluid leaks from pressurized hose 80 into outer hose 90. In embodiments, a leak of fluid from pressurized hose 80 is visually detected by an expansion of outer hose 90, for example via an increase in the outer diameter/circumference of the outer hose 90 and/or "ballooning" of the outer hose that forms a bulge or other protuberance that is visible via human or machine observation of the outer surface 92 of the outer hose 90. In embodiments, the outer hose 80 is elastic (e.g., comprises an elastomer or elastomeric material such as natural or synthetic rubber, polyisoprene, polybutadiene, polychloroprene, butyl rubber, styrene-butadiene rubber, nitrile rubber, ethylene propylene rubber, silicone rubber, polyacrylic rubber, fluroelastomers, perfluroelastomers, etc.) and can expand to provide the (or an increased volume of) annular chamber 40. The annular chamber 40 can contain a volume of fluid that is greater than or equal to about 1, 10, 50, 100, 200, 300, 400, 500, 600, 700, 800, 900, 1000, 2000, 3000, 4000, 5000, or 10,000 cm$^3$, in embodiments. In an embodiment, the elastic outer hose 80 can expand slowly due to a slow leak of pressurized hose 80, and provide sufficient volume to contain the leaked fluid without allowing it to leak to the outside environment.

With reference back to FIG. 4A, in embodiments, the leak detection system further comprises the leak sensor 50. A connector 51 can connect leak sensor 50 with hose assembly 70 (e.g., with annular chamber 40 and/or the intersection of inner surface 93 of outer hose 90 and outer surface 82 of pressurized hose 80). Leak sensor 50 can be in communication with the annular chamber 40 such that a leak of fluid from the pressurized hose 80 into the annular chamber can be detected by manual and/or automated monitoring of the leak sensor 50. For example, manual monitoring of the leak sensor 50 can comprise visual observation of the leak sensor 50, for example, to observe a reading or condition thereof (e.g., normal or alert). Automated monitoring of the leak sensor 50 can comprise, for example, monitoring of the leak sensor 50 by a computer 100 in signal communication with the leak sensor 50. In embodiments, leak detection is monitored both visually by a human and automatically by a computer 100.

The leak sensor 50 can comprise any sensor operable to detect a leak of fluid into annular chamber 40. For example, in embodiments, leak sensor 50 comprises a pressure sensor, a flow sensor, a moisture sensor, an oil sensor, an acoustic sensor, a temperature sensor, or a combination thereof. In embodiments, the pressurized hose 80 has a first end 81A opposite a second end 81B, and the outer hose 90 is connected or coupled to the pressurized hose 80 at at least a first location 91A and a second location 91B such that the annular chamber 40 extends (or, upon formation, can extend) between the outer surface of the pressurized hose 82 and an inner surface 93 of the outer hose 90 from the first location 91A to the second location 91B, thereby providing an actual or potential annular volume. In embodiments, a length along the pressurized hose 80 from the first end 81A of the pressurized hose 80 to the first location 91A is less than or equal to about 10, 20, or 30% of a total length of the pressurized hose 80 and/or a length along the pressurized hose 80 from the second end 81B of the pressurized hose to the second location 91B is less than or equal to 10, 20, or 30% of the total length of the pressurized hose 80.

The outer hose 90 can be connected or coupled to the pressurized hose 80 at the first location 91A and the second location 91B by any means known to those of skill in the art and with the help of this disclosure. For example, in embodiments, the outer hose 90 can be connected or coupled to the pressurized hose 80 at the first location 91A and the second location 91B by a component independently selected from a clamp 95, a sealant 96 between the inner surface 93 of the outer hose 90 and the outer surface 82 of the pressurized hose 80, a crimp 97, or a combination thereof. In an embodiment, the outer hose 90 can be fused to the pressurized hose 80 at the first location 91A and the second location 91B.

As depicted in the embodiment of FIG. 4A, in embodiments the pressurized hose 80 is a suction hose fluidly coupled with a reciprocating element 18, as described hereinabove, and a suction manifold 84 (also referred to herein as a "stationary fluid manifold" 84). In such embodiments, the hose assembly 70 can be utilized to provide pressurized fluid from the suction manifold to the reciprocating element 18. In such embodiments, the first end 81A of the pressurized hose 80 is fluidly coupled with the suction manifold 84, and the second end 81B of the pressurized hose 80 is fluidly coupled with a reciprocating element 18.

Also disclosed herein is a pump fluid end 22 comprising the hose assembly 70 of this disclosure. According to this disclosure, the pump fluid end 22 is a concentric bore pump fluid end 22 such as depicted in FIG. 2A or a cross-bore pump fluid end such as T-bore pump fluid end 22 of FIG. 2B. As described hereinabove with reference to FIG. 2A and FIG. 2B, in addition to the hose assembly 70, the pump fluid end 22 further comprises a reciprocating element 18 disposed at least partially within a reciprocating element bore 24 of the pump fluid end 22, a discharge valve assembly 72 and a suction valve assembly 56. The reciprocating element 18 is fluidly connected with hose assembly 70, and is coupled with the suction valve assembly 56, such that, during operation, fluid can be introduced (during a suction stroke) from suction manifold 84 into reciprocating element 18 via the hose assembly 70. In some such embodiments, the pressurized hose 80 is a pressurized suction hose 80.

In embodiments, the pump fluid end 22 comprises a suction valve stop for assisting closure of suction valve assembly 56, as described, for example, in U.S. patent application Ser. No. 16/436,312 filed Jun. 10, 2019 and entitled "Pump Fluid End with Suction Valve Closure Assist", the disclosure of which is hereby incorporated herein in its entirety for purposes not contrary to this disclosure.

In embodiments, reciprocating element 18 comprises tool engagement features on front 60 thereof, whereby reciprocating element 18 can be removed from pump fluid end 22 by engaging a tool with the tool engagement features, as described, for example, in U.S. patent application Ser. No. 16/411,905 filed May 14, 2019, which is entitled "Pump Plunger with Wrench Features", the disclosure of which is hereby incorporated herein in its entirety for purposes not contrary to this disclosure.

In embodiments, discharge valve assembly 72 and/or suction valve assembly 56 comprises a valve assembly having a valve guide, as described, for example, in U.S. patent application Ser. No. 16/411,910 filed May 14, 2019, which is entitled "Valve Assembly for a Fluid End with Limited Access", the disclosure of which is hereby incorporated herein in its entirety for purposes not contrary to this disclosure. In embodiments, a discharge valve seat of discharge valve assembly 72 and/or a suction valve seat of suction valve assembly 56 is a valve seat with supplemental retention, as described, for example, in U.S. patent application Ser. No. 16/411,898 filed May 14, 2019, which is entitled "Pump Valve Seat with Supplemental Retention", the disclosure of which is hereby incorporated herein in its entirety for purposes not contrary to this disclosure.

In embodiments, pump fluid end 22 is a pump fluid end 22 with an easy access suction valve, as described, for example, in U.S. patent application Ser. No. 16/411,891 filed May 14, 2019, which is entitled "Pump Fluid End with Easy Access Suction Valve", the disclosure of which is hereby incorporated herein in its entirety for purposes not contrary to this disclosure.

Also disclosed herein is a pump 10 comprising a pump fluid end 22 of this disclosure comprising the hose assembly 70 as described herein. The pump of this disclosure comprises a pump power end 12 (e.g., as described with reference to FIG. 3, hereinabove) and a pump fluid end 22. The pump power end 12 is operable to reciprocate the reciprocating element 18 within a reciprocating element bore 24 of the pump fluid end 22. As described hereinabove, the pump fluid end 22 comprises: the reciprocating element 18, a suction valve assembly 56, a discharge valve assembly 72, and the hose assembly 70 of this disclosure. Reciprocating element 18 is disposed at least partially within the reciprocating element bore 24, and is at least partially hollow and has a front end 60 opposite a tail end 62 along a central axis 17 of the reciprocating element bore 24. According to this disclosure, the suction valve assembly 56 of pump 10 is coupled with the front end 60 of the reciprocating element 18.

During operation of pump 10, pressurized suction hose 80 of hose assembly 70 reciprocates with reciprocating element 18, such that the second end 81B of the pressurized hose 80 follows the path denoted by the range of motion 85 in FIG. 4A.

In embodiments, the pump fluid end 22 of the pump 10 is a concentric bore pump fluid end 22, such as depicted in the embodiment of FIG. 2A, and the discharge valve assembly 72 is positioned at least partially within the reciprocating element bore 24 and is coaxially aligned with the suction valve assembly 56. In embodiments, the pump fluid end 22 of the pump 10 is a tee-bore pump fluid end 22, such as depicted in the embodiment of FIG. 2B, and the discharge valve assembly 72 is positioned within a tee-bore 25 of the pump fluid end 22, wherein the tee-bore 25 is perpendicular to the reciprocating element bore 24. In embodiments, pump 10 comprises a discharge valve module comprising discharge valve assembly 72, such as disclosed, for example, in U.S. patent application Ser. No. 16/522,860 filed Jul. 26, 2019, which is entitled "Oil Field Pumps with Reduced Maintenance", the disclosure of which is hereby incorporated herein in its entirety for purposes not contrary to this disclosure.

In embodiments, reciprocating element 18 is coupled with a pushrod 32 of a pump power end 12 via a reciprocating element adapter, as described, for example, in U.S. patent application Ser. No. 16/411,894 filed May 14, 2019, which is entitled "Easy Change Pump Plunger", the disclosure of which is hereby incorporated herein in its entirety for purposes not contrary to this disclosure. As described therein, in such embodiments, mechanical linkages 4 can comprise the reciprocating element adapter and/or a clamp. In such embodiments, hose assembly 70 provides pressurized fluid to the reciprocating element adapter, which is coupled with tail end 62 of reciprocating element 18. In such embodiments, second end 81B of pressurized hose 80 is coupled with the reciprocating element adapter, whereby fluid can be introduced from the suction manifold 84 into the reciprocating element 18 via the reciprocating element adapter. Thus, pressurized hose 80 can be directly connected with the tail end 62 of reciprocating element 18 or with a reciprocating element adapter that is itself coupled with tail end 62 of reciprocating element 18.

In embodiments, the pressurized (e.g., suction) hose 80 is pre-formed or molded into a shape assumed by the pressurized hose 80 when the reciprocating element 18 is positioned halfway between a fully extended position, when a crankshaft 16 of the pump power end 12 is at top dead center (TDC), and a fully retracted position, when the crankshaft 16 is at bottom dead center (BDC). For example, when the pressurized hose 70 has the range of motion 85 depicted by dotted lines in FIG. 4A, the pressurized hose 80 can be pre-formed or molded into the shape depicted in FIG. 4A, in which pressurized hose 70 is in the middle of the distance provided by the range of motion 85. In this manner, maximum bend stresses on the suction hose 80 can be minimized, potentially providing a longer suction hose 80 lifetime prior to cracking and/or fatiguing of the suction hose 80.

In embodiments, the suction hose 80 is exposed to a pressure of less than 300 psi, less than 200 psi, or less than 30 psi during operation of the pump 10. When the pressure is low (e.g., less than or equal to about 500, 400, 300, 200, or 100 psi), a leak from pressurized hose 80 will result in leaked fluid slowly filling annular chamber 40 and, in embodiments, expansion of outer hose 90. Such expansion of outer hose 90 may be visible to a pump operator.

In embodiments, suction valve assembly 56 and/or discharge valve assembly 72 of pump fluid end 22 comprises a valve poppet assembly, as described, for example, in U.S. patent application Ser. No. 16/436,356 filed Jun. 10, 2019, which is entitled "Multi-Material Frac Valve Poppet", the disclosure of which is hereby incorporated herein in its entirety for purposes not contrary to this disclosure.

In embodiments, pump fluid end 22 comprises a packing assembly, such that packing 29, a packing carrier, and a packing screw can be removed from back S2 of pump fluid end 22 when crankshaft 16 is at TDC, as described, for example, in U.S. patent application Ser. No. 16/411,911 filed May 14, 2019, which is entitled "Pump Fluid End with Positional Indifference for Maintenance", the disclosure of which is hereby incorporated herein in its entirety for purposes not contrary to this disclosure.

In embodiments, pump 10 comprises a flexible manifold for feeding fluid into reciprocating element 18, as described, for example, in U.S. patent application Ser. No. 16/411,901 filed May 14, 2019, which is entitled "Flexible Manifold for Reciprocating Pump", the disclosure of which is hereby incorporated herein in its entirety for purposes not contrary to this disclosure. In embodiments, the flexible manifold comprises a hose assembly 70 of this disclosure.

A pump 10 of this disclosure can comprise multi-layer surface coating disposed on reciprocating element 18 and/or a sleeve that provides cylindrical wall 26, as described, for example, in U.S. patent application Ser. No. 16/436,389 filed Jun. 10, 2019, which is entitled "Multi-Layer Coating for plunger and/or Packing Sleeve", the disclosure of which is hereby incorporated herein in its entirety for purposes not contrary to this disclosure.

A pump 10 of this disclosure can be a multiplex pump comprising a plurality of reciprocating assemblies (e.g., reciprocating elements 18, and a corresponding plurality of reciprocating element bores 24, suction valve assemblies 56, and discharge valve assemblies 72). The plurality can comprise any number such as, for example, 2, 3, 4, 5, 6, 7, or more. For example, in embodiments, pump 10 is a triplex pump, wherein the plurality comprises three. In alternative embodiments, pump 10 comprises a Quintuplex pump, wherein the plurality comprises five.

Also disclosed herein is a method of monitoring for leaks in a pump 10 of this disclosure comprising the hose assembly 70. The method comprises: coupling a pump of the type described herein to a wellbore, operating the pump and pumping a wellbore servicing fluid into the wellbore, and monitoring the fail safe hose assembly 70 described herein to determine whether or not the pressurized hose 80 is leaking. As noted previously, monitoring the hose assembly 70 can comprise visually and/or automatically (e.g., computerized) examining the outer hose 90 and/or the leak sensor 50 that is in communication with the annular chamber 40. As noted previously, any sensor operable for the detection of leaks can be utilized. In embodiments, the leak sensor 50 comprises a pressure sensor, a flow sensor, a moisture sensor, an oil sensor, an acoustic sensor, a temperature sensor, or a combination thereof. Monitoring of the hose assembly 70 can comprise automatically monitoring, via a computer 100, a leak sensor 50 in communication with the hose assembly 70, the outer hose 90, the annular chamber 40, or a combination thereof.

In embodiments, automated monitoring is effected via computer 100, and the computer 100 further comprises programming configured such that, if a leak is detected, a control system 110 in signal communication with the computer 100 redirects flow of a fluid through the pump 10 to one or more other pumps 10 such that the pump 10 can be taken offline for repair of the detected leak. Computer 100 can instruct control system 110 to slowly redirect fluid flow to the one or more other pumps 10.

In embodiments, pump 10 further comprises a valve disabler, whereby operation of pump 10 can be ceased upon detection of a leak of pressurized hose 80 by engagement of the valve disabler with suction valve assembly 56. Such a valve disabler may be a suction valve disabler as disclosed, for example, in U.S. patent application Ser. No. 16/522,860 filed Jul. 26, 2019, which is entitled "Oil Field Pumps with Reduced Maintenance", the disclosure of which is hereby incorporated herein in its entirety for purposes not contrary to this disclosure.

Figure 5:
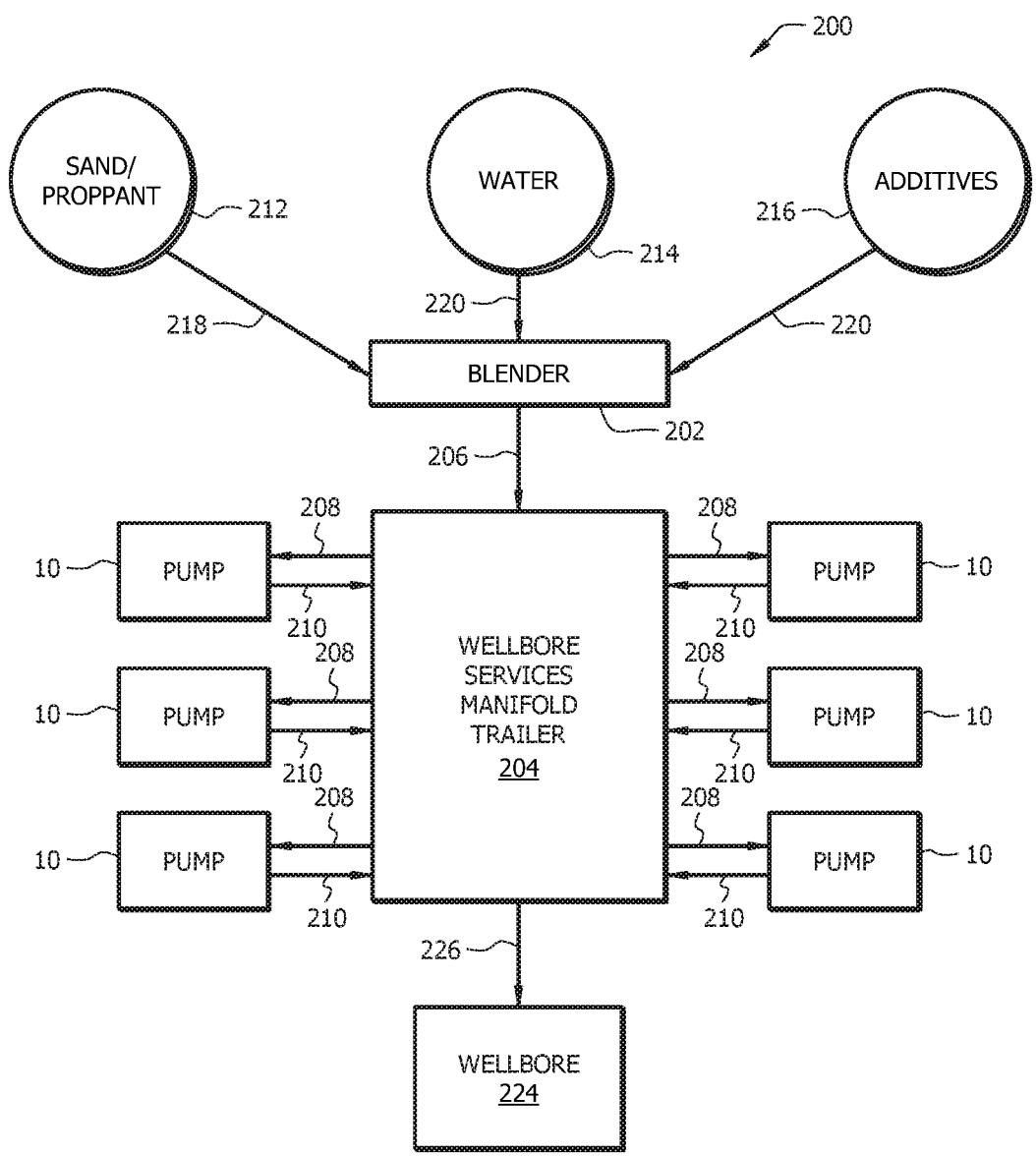
FIG. 5 is a schematic representation of an embodiment of a wellbore servicing system, according to embodiments of this disclosure.

Also disclosed herein are a method of servicing a wellbore and a wellbore servicing system 200 comprising a pump of this disclosure. An embodiment of a wellbore servicing system 200 and a method of servicing a wellbore via the wellbore servicing system 200 will now be described with reference to FIG. 5, which is a schematic representation of an embodiment of a wellbore servicing system 200, according to embodiments of this disclosure.

A method of servicing a wellbore 224 according to this disclosure comprises: fluidly coupling a pump 10 of this disclosure comprising a hose assembly 70 of this disclosure, as described hereinabove, to a source of a wellbore servicing fluid and to the wellbore 224, and communicating wellbore servicing fluid into the wellbore 224 via the pump 10. In some such embodiments, pressurized hose 80 can be a pressurized suction hose 80. As detailed further hereinabove, the pump 10 of this disclosure comprises a pump fluid end 12 and a pump power end 22. The pump power end 12 is operable to reciprocate a reciprocating element 18 within a reciprocating element bore 24 of the pump fluid end 22. The pump fluid end 22 comprises: the reciprocating element 18 disposed at least partially within the reciprocating element bore 24, a suction valve assembly 56 coupled with the front end 60 of the reciprocating element 18, a discharge valve assembly 72, and a hose assembly 70 of this disclosure. According to this disclosure, the reciprocating element 18 is at least partially hollow and has a front end 60 opposite a tail end 62 along a central axis 17 of the reciprocating element bore 24. In embodiments, the hose assembly 70 of this disclosure comprises a pressurized suction hose 80 and a leak detection system. The pressurized suction hose 80 has a first end 81A fluidly coupled with a suction manifold 84 and a second end 81B opposite the first end 81A and fluidly coupled with the tail end 62 of the reciprocating element 18. The pressurized suction hose 80 is exposed to pressure during at least a part of the operation of the pump 10. The leak detection system comprises an outer hose 90 concentrically positioned about at least a portion of the pressurized suction hose 80 such that an annular chamber 40 between the pressurized suction hose 80 and the outer hose 90 can contain a volume of fluid that may leak from the pressurized suction hose 80, whereby a leak of the pressurized suction hose 80 can be detected by monitoring the hose assembly 70 and/or a leak sensor 50 associated therewith.

The method of servicing the wellbore can further comprise: monitoring the hose assembly 70, the outer hose 90, the annular chamber 40, the leak sensor 50, or a combination thereof to determine if the pressurized suction hose 80 has developed a leak; discontinuing the communicating of the wellbore servicing fluid into the wellbore 224 via the pump 10 upon detection of a leak; subjecting the pump 10 to maintenance to provide a maintained pump 10; and communicating the or another wellbore servicing fluid into the wellbore 224 via the maintained pump 10. Subjecting the pump 10 to maintenance comprises: replacing the pressurized suction hose 80 that has the leak. In embodiments, discontinuing the communicating of the wellbore servicing fluid into the wellbore 224 via the pump 10 upon detection of the leak further comprises redirecting a flow of fluid from the pump 10 to one or more other pumps 10. As described hereinabove, in embodiments, the monitoring of the hose assembly 70, the outer hose 90, the annular chamber 40, the leak sensor 50, or the combination thereof, the directing the flow of fluid from the pump 10 to the one or more other pumps 10, or a combination thereof is automated.

It will be appreciated that the wellbore servicing system 200 disclosed herein can be used for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, the another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, diverter fluids, sealants, drilling fluids, completion fluids, gelation fluids, polymeric fluids, aqueous fluids, oleaginous fluids, etc.

In embodiments, the wellbore servicing system 200 comprises one or more pumps 10 operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system is illustrated, skilled artisans will readily appreciate that the pump 10 disclosed herein may be employed in any suitable operation.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., such as pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 212, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted by nitrogen or carbon dioxide; some in a foaming condition.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, the pump(s) 10 (e.g., pump(s) 10 and/or maintained pump(s) 10) pressurize the wellbore servicing fluid to a pressure suitable for delivery into a wellbore 224 or wellhead. For example, the pumps 10 may increase the pressure of the wellbore servicing fluid (e.g., the wellbore servicing fluid and/or the another wellbore servicing fluid) to a pressure of greater than or equal to about 3,000 psi, 5,000 psi, 10,000 psi, 20,000 psi, 30,000 psi, 40,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the flow connector wellbore 1128 of between about 1 BPM to about 200 BPM, alternatively from between about 50 BPM to about 150 BPM, alternatively about 100 BPM. In embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. In embodiments, each of one or more pumps 10 discharge wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 224). Without limitation, servicing the wellbore may include: positioning the wellbore servicing composition in the wellbore 224 (e.g., via one or more pumps 10 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared on-site (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10 disclosed herein.

In alternative embodiments, the reciprocating apparatus may comprise a compressor. In embodiments, a compressor similar to the pump 10 may comprise at least one each of a cylinder, plunger, connecting rod, crankshaft, and housing, and may be coupled to a motor. In embodiments, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In embodiments, a reciprocating apparatus comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 10). A reciprocating element 18 such as a plunger may be similarly arranged to move in reciprocating fashion within the cylinder. Skilled artisans will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical 4-stroke engine, arbitrarily beginning with the exhaust stroke, the plunger is fully extended during the exhaust stroke, (e.g., minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air/fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Those of ordinary skill in the art will readily appreciate various benefits that may be realized by the present disclosure. For instance, in embodiments, the herein disclosed hose assembly can be utilized to provide fail safe (e.g., "safer") operation of a reciprocating apparatus, such as a reciprocating pump as described herein. Although described with reference to a reciprocating apparatus, a hose assembly 70 of this disclosure can be utilized for safer transfer of pressurized fluid via any apparatus utilizing the hose assembly 70. By providing a leak detection system comprising an annular chamber 40 that provides a volume for leaked fluid, as described herein, a leak of a pressurized hose 80 can be detected before fluid leaks into the environment surrounding the hose assembly 70. That is, a volume of fluid can leak into the annular chamber 40 from pressurized (e.g., suction) hose 80 and be retained within the annular chamber 40 and detected before fluid leaks into the surrounding environment. In embodiments, the annular chamber 40 is formed by a leak. Alternatively or additionally, annular chamber 40 exists between pressurized hose 80 and outer hose 90 even in the absence of a leak, and can, in embodiments, increase in volume in the presence of a leak from pressurized hose 80.

Utilization of a hose assembly 70 as a suction hose assembly of a pump 10 comprising a hollow reciprocating element coupled with suction valve assembly 56, a conventionally employed suction chamber within pump fluid end 22 is not needed, and reciprocating element 18 can be shorter than a reciprocating element utilized with such a suction chamber.

ADDITIONAL DISCLOSURE

The following are non-limiting, specific embodiments in accordance with the present disclosure:

Embodiment A

A hose assembly for a pump, the hose assembly comprising: a pressurized hose, wherein the pressurized hose is exposed to pressure during at least a part of the operation of the pump; and a leak detection system comprising an outer hose concentrically positioned about at least a portion of the pressurized hose such that an annular chamber exists between the pressurized hose and the outer hose, whereby a leak of the pressurized hose can be detected by monitoring the hose assembly and/or a leak sensor associated therewith.

Embodiment B

The hose assembly of Embodiment A, wherein the outer hose is elastic such that a leak of the pressurized hose can be detected by visual observation of the outer hose.

Embodiment C

The hose assembly of Embodiment A or Embodiment B, wherein the leak detection system further comprises the leak sensor, wherein the leak sensor is in communication with the annular chamber such that a leak of the pressurized hose can be detected by manual and/or automated monitoring of the leak sensor.

Embodiment D

The hose assembly of Embodiment C, wherein manual monitoring of the leak sensor comprises visual observation of the leak sensor, wherein automated monitoring of the leak sensor comprises monitoring of the leak sensor by a computer in signal communication with the leak sensor, or a combination thereof.

Embodiment E

The hose assembly of any of Embodiment A through Embodiment D, wherein the leak sensor comprises a pressure sensor, a flow sensor, a moisture sensor, an oil sensor, an acoustic sensor, or a combination thereof.

Embodiment F

The hose assembly of any of Embodiment A through Embodiment E, wherein the pressurized hose is a suction hose fluidly coupled with a reciprocating element and a suction manifold of the pump.

Embodiment G

The hose assembly of Embodiment F, wherein the reciprocating element is positioned at least partially within a reciprocating element bore of a pump fluid end of the pump, and wherein the pump fluid end is a concentric bore pump fluid end.

Embodiment H

The hose assembly of Embodiment F, wherein the reciprocating element is positioned at least partially within a reciprocating element bore of a pump fluid end of the pump, and wherein the pump fluid end is a tee-bore pump fluid end.

Embodiment I

The hose assembly of any of Embodiment A through Embodiment H, wherein the pressurized hose has a first end opposite a second end, and wherein the outer hose is connected to the pressurized hose at a first location and a second location such that the annular chamber extends between an outer surface of the pressurized hose and an inner surface of the outer hose from the first location to the second location.

Embodiment J

The hose assembly of Embodiment I, wherein a length along the pressurized hose from the first end to the first location is less than or equal to about 10, 20, or 30% of a total length of the pressurized hose, wherein a length along the pressurized hose from the second end to the second location is less than or equal to 10, 20, or 30% of a total length of the pressurized hose, or both.

Embodiment K

The hose assembly hose assembly of Embodiment I or Embodiment J, wherein the first end is fluidly coupled with a suction manifold, and wherein the second end is fluidly coupled with a reciprocating element of the pump.

Embodiment L

The hose assembly of any of Embodiment I through Embodiment K, wherein the outer hose is connected to the pressurized hose at the first location and the second location by a component independently selected from a clamp, a sealant between the inner surface of the outer hose and the outer surface of the pressurized hose, a crimp, or a combination thereof.

Embodiment M

A pump comprising: a pump power end and a pump fluid end, wherein the pump power end is operable to reciprocate a reciprocating element within a reciprocating element bore of the pump fluid end, and wherein the pump fluid end comprises: the reciprocating element disposed at least partially within the reciprocating element bore, wherein the reciprocating element is at least partially hollow and has a front end opposite a tail end along a central axis of the reciprocating element bore; a suction valve assembly coupled with the front end of the reciprocating element; a discharge valve assembly; a suction hose having a first end fluidly coupled with a suction manifold and a second end opposite the first end and fluidly coupled with the tail end of the reciprocating element, wherein the suction hose is exposed to pressure during at least a part of the operation of the pump, and wherein the second end of the suction hose reciprocates with the reciprocating element; and a leak detection system comprising an outer hose concentrically positioned about at least a portion of the suction hose such that an annular chamber exists between the suction hose and the outer hose, whereby a leak of the suction hose can be detected by monitoring the hose assembly and/or a leak sensor associated therewith.

Embodiment N

The pump of Embodiment M, wherein the pump fluid end is a concentric bore pump fluid end, wherein the discharge valve assembly is positioned at least partially within the reciprocating element bore and is coaxially aligned with the suction valve assembly.

Embodiment O

The pump of Embodiment M, wherein the pump fluid end is a tee-bore pump fluid end, wherein the discharge valve assembly is positioned within a tee-bore of the pump fluid end, and wherein the tee-bore is perpendicular to the reciprocating element bore.

Embodiment P

The pump of any of Embodiment M through Embodiment O, wherein the outer hose is elastic such that a leak of the pressurized hose can be detected by visual observation of the outer hose.

Embodiment Q

The pump of any of Embodiment M through Embodiment P, wherein the leak detection system further comprises the leak sensor, wherein the leak sensor is in communication with the annular chamber such that a leak of the pressurized hose can be detected by manual and/or automated monitoring of the leak sensor.

Embodiment R

The pump of Embodiment Q, wherein manual monitoring of the leak sensor comprises visual observation of the leak sensor, wherein automated monitoring of the leak sensor comprises monitoring of the leak sensor by a computer in signal communication with the leak sensor, or a combination thereof.

Embodiment S

The pump of any of Embodiment M through Embodiment R, wherein the suction hose is pre-formed or molded into a shape assumed by the suction hose when the reciprocating element is positioned halfway between a fully extended position, when a crankshaft of the pump power end is at top dead center (TDC), and a fully retracted position, when the crankshaft is at bottom dead center (BDC).

Embodiment T

A method of monitoring for leaks in a pump comprising the hose assembly of any of Embodiment A through Embodiment L, the method comprising: monitoring the hose assembly to determine whether or not the pressurized hose is leaking.

Embodiment U

The method of Embodiment T, wherein monitoring the hose assembly comprises visually examining the outer hose and/or a leak sensor in communication with the annular chamber.

Embodiment V

The method of Embodiment U, wherein the leak sensor comprises a pressure sensor, a flow sensor, a moisture sensor, an oil sensor, an acoustic sensor, or a combination thereof.

Embodiment W

The method of any of Embodiment T through Embodiment V, wherein monitoring comprises automatically monitoring, via a computer, a leak sensor in communication with the hose assembly, the outer hose, the annular chamber, or a combination thereof.

Embodiment X

The method of embodiment W, wherein the computer comprises programming configured such that, if a leak is detected, flow of a fluid through the pump is redirected to one or more other pumps such that the pump can be taken offline for repair of the detected leak.

Embodiment Y

A method of servicing a wellbore, the method comprising: fluidly coupling a pump to a source of a wellbore servicing fluid and to the wellbore; and communicating wellbore servicing fluid into the wellbore via the pump, wherein the pump comprises a pump fluid end and a pump power end, wherein the pump power end is operable to reciprocate a reciprocating element within a reciprocating element bore of the pump fluid end, and wherein the pump fluid end comprises: the reciprocating element disposed at least partially within the reciprocating element bore, wherein the reciprocating element is at least partially hollow and has a front end opposite a tail end along a central axis of the reciprocating element bore; a suction valve assembly coupled with the front end of the reciprocating element; a discharge valve assembly; and a hose assembly, wherein the hose assembly comprises a suction hose having a first end fluidly coupled with a suction manifold and a second end opposite the first end and fluidly coupled with the tail end of the reciprocating element, wherein the suction hose is exposed to pressure during at least a part of the operation of the pump; and a leak detection system comprising an outer hose concentrically positioned about at least a portion of the suction hose such that an annular chamber between the suction hose and the outer hose can contain a volume of fluid that may leak from the suction hose, whereby a leak of the suction hose can be detected by monitoring the hose assembly and/or a leak sensor associated therewith.

Embodiment Z1

The method of Embodiment Y further comprising: monitoring the hose assembly, the outer hose, the annular chamber, the leak sensor, or a combination thereof to determine if the suction hose has a leak; discontinuing the communicating of the wellbore servicing fluid into the wellbore via the pump upon detection of a leak; subjecting the pump to maintenance to provide a maintained pump; and communicating the or another wellbore servicing fluid into the wellbore via the maintained pump, wherein subjecting the pump to maintenance comprises: replacing the suction hose that has the leak.

Embodiment Z2

The method of Embodiment Z1, wherein discontinuing the communicating of the wellbore servicing fluid into the wellbore via the pump upon detection of the leak further comprises redirecting a flow of fluid from the pump to one or more other pumps.

Embodiment Z3

The method of Embodiment Z2, wherein the monitoring of the hose assembly, the outer hose, the annular chamber, the leak sensor, or the combination thereof, the directing the flow of fluid from the pump to the one or more other pumps, or a combination thereof is automated.

Embodiment Z4

The method of any of Embodiment Z1 through Embodiment Z3, wherein the wellbore servicing fluid, the another wellbore servicing fluid, or both the wellbore servicing fluid and the another wellbore servicing fluid comprise a fracturing fluid, a cementitious fluid, a remedial fluid, a perforating fluid, a sealant, a drilling fluid, a spacer fluid, a completion fluid, a gravel pack fluid, a gelation fluid, a polymeric fluid, an aqueous fluid, an oleaginous fluid, or a combination thereof.

Embodiment Z5

The method of any of Embodiment Z1 through Embodiment Z4, wherein the pump or the maintained pump operates during the pumping of the wellbore servicing fluid or the another wellbore servicing fluid at a pressure of greater than or equal to about 3,000 psi, 5,000 psi, 10,000 psi, 20,000 psi, 30,000 psi, 40,000 psi, or 50,000 psi.

Embodiment Z6

The method of any of Embodiment Z1 through Embodiment Z5, wherein the pump or the maintained pump operates during the pumping of the wellbore servicing fluid or the another wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

Embodiment Z7

The method of any of Embodiment Y through Embodiment Z6, wherein the suction hose is exposed to a pressure of less than 300 psi, less than 200 psi, or less than 30 psi during operation of the pump.

Embodiment Z8

The method of any of Embodiment Y through Embodiment Z7, wherein the outer hose is elastic and can expand to provide the annular chamber, and wherein the annular chamber can contain a volume of fluid that is at least 1, 10, 50, 100, 200, 300, 400, 500, 600, 700, 800, 900, 1000, 2000, 3000, 4000, 5000, or 10,000 cm$^3$.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:
1. A hose assembly for a pump, the hose assembly comprising:
   a pressurized hose, wherein the pressurized hose is exposed to pressure during at least a part of the operation of the pump, wherein the pressurized hose has a first end and a second end, wherein the second end is fluidly coupled with a reciprocating element such that second end of the pressurized hose reciprocates with the reciprocating element during operation of the pump; and
   a leak detection system comprising an outer hose concentrically positioned about at least a portion of the pressurized hose such that an annular chamber exists between the pressurized hose and the outer hose, whereby a leak of the pressurized hose is detectable by monitoring the hose assembly and/or a leak sensor associated therewith.

2. The hose assembly of claim 1, wherein the outer hose is elastic such that a leak of the pressurized hose can be detected by visual observation of the outer hose.

3. The hose assembly of claim 1, wherein the leak detection system further comprises the leak sensor, wherein the leak sensor is in communication with the annular chamber such that a leak of the pressurized hose detectable by manual and/or automated monitoring of the leak sensor.

4. The hose assembly of claim 3, wherein manual monitoring of the leak sensor comprises visual observation of the leak sensor, wherein automated monitoring of the leak sensor comprises monitoring of the leak sensor by a computer in signal communication with the leak sensor, or a combination thereof.

5. The hose assembly of claim 3, wherein the leak sensor comprises a pressure sensor, a flow sensor, a moisture sensor, an oil sensor, an acoustic sensor, or a combination thereof.

6. The hose assembly of claim 1, wherein the pressurized hose is a suction hose fluidly coupled with the reciprocating element and a suction manifold of the pump.

7. The hose assembly of claim 6, wherein the reciprocating element is positioned at least partially within a reciprocating element bore of a pump fluid end of the pump, and wherein the pump fluid end is a concentric bore pump fluid end.

8. The hose assembly of claim 6, wherein the reciprocating element is positioned at least partially within a reciprocating element bore of a pump fluid end of the pump, and wherein the pump fluid end is a tee-bore pump fluid end.

9. The hose assembly of claim 1, wherein the outer hose is connected to the pressurized hose at a first location and a second location such that the annular chamber extends between an outer surface of the pressurized hose and an inner surface of the outer hose from the first location to the second location.

10. The hose assembly of claim 9, wherein a length along the pressurized hose from the first end to the first location is less than or equal to 10, 20, or 30% of a total length of the pressurized hose, wherein a length along the pressurized hose from the second end to the second location is less than or equal to 10, 20, or 30% of a total length of the pressurized hose, or both.

11. The hose assembly of claim 9, wherein the first end is fluidly coupled with a suction manifold.

12. The hose assembly of claim 11, wherein the outer hose is connected to the pressurized hose at the first location and the second location by a component independently selected from a clamp, a sealant between the inner surface of the outer hose and the outer surface of the pressurized hose, a crimp, or a combination thereof.

13. A pump comprising:
   a pump power end and a pump fluid end,
      wherein the pump power end is operable to reciprocate a reciprocating element within a reciprocating element bore of the pump fluid end, and
      wherein the pump fluid end comprises:
         the reciprocating element disposed at least partially within the reciprocating element bore, wherein the reciprocating element is at least partially hollow and has a front end opposite a tail end along a central axis of the reciprocating element bore;
         a suction valve assembly coupled with the front end of the reciprocating element;
         a discharge valve assembly; and
         the hose assembly of claim 1, wherein the pressurized hose comprises
         a suction hose having a first end fluidly coupled with a suction manifold and a second end opposite the first end and fluidly coupled with the tail end of the reciprocating element, wherein the suction hose is exposed to pressure during at least a part of the operation of the pump, and wherein the second end of the suction hose reciprocates with the reciprocating element; and
      the leak detection system comprises an outer hose concentrically positioned about at least a portion of the suction hose such that the annular chamber exists between the suction hose and the outer hose, whereby a leak of the suction hose detectable by monitoring the hose assembly and/or a leak sensor associated therewith.

14. The pump of claim 13:
   wherein the pump fluid end is a concentric bore pump fluid end, wherein the discharge valve assembly is positioned at least partially within the reciprocating element bore and is coaxially aligned with the suction valve assembly; or
   wherein the pump fluid end is a tee-bore pump fluid end, wherein the discharge valve assembly is positioned within a tee-bore of the pump fluid end, and wherein the tee-bore is perpendicular to the reciprocating element bore.

15. The pump of claim 14, wherein the outer hose is elastic such that a leak of the pressurized hose is detectable by visual observation of the outer hose.

16. The pump of claim 14, wherein the leak detection system further comprises the leak sensor, wherein the leak sensor is in communication with the annular chamber such that a leak of the pressurized hose is detectable by manual and/or automated monitoring of the leak sensor.

17. The pump of claim 16, wherein manual monitoring of the leak sensor comprises visual observation of the leak sensor, wherein automated monitoring of the leak sensor comprises monitoring of the leak sensor by a computer in signal communication with the leak sensor, or a combination thereof.

18. A method of servicing a wellbore, the method comprising:
   fluidly coupling a pump to a source of a wellbore servicing fluid and to the wellbore; and communicating wellbore servicing fluid into the wellbore via the pump, wherein the pump comprises a pump fluid end and a pump power end, wherein the pump power end is operable to reciprocate a reciprocating element within a reciprocating element bore of the pump fluid end, and wherein the pump fluid end comprises:

the reciprocating element disposed at least partially within the reciprocating element bore, wherein the reciprocating element is at least partially hollow and has a front end opposite a tail end along a central axis of the reciprocating element bore;

a suction valve assembly coupled with the front end of the reciprocating element;

a discharge valve assembly; and the hose assembly of claim 1, wherein the pressurized hose of the hose assembly comprises a suction hose having a first end fluidly coupled with a suction manifold and a second end opposite the first end and fluidly coupled with the tail end of the reciprocating element such that the second end of the suction hose reciprocates with the reciprocating element during operation of the pump, wherein the suction hose is exposed to pressure during at least a part of the operation of the pump; and the leak detection system comprises an outer hose concentrically positioned about at least a portion of the suction hose such that an annular chamber between the suction hose and the outer hose can contain a volume of fluid that may leak from the suction hose, whereby a leak of the suction hose is detectable by monitoring the hose assembly and/or a leak sensor associated therewith.

19. The method of claim 18 further comprising:

monitoring the hose assembly, the outer hose, the annular chamber, the leak sensor, or a combination thereof to determine if the suction hose has a leak;

discontinuing the communicating of the wellbore servicing fluid into the wellbore via the pump upon detection of a leak;

subjecting the pump to maintenance to provide a maintained pump; and communicating the or another wellbore servicing fluid into the wellbore via the maintained pump, wherein subjecting the pump to maintenance comprises: replacing the suction hose that has the leak.

20. The method of claim 19, wherein discontinuing the communicating of the wellbore servicing fluid into the wellbore via the pump upon detection of the leak further comprises redirecting a flow of fluid from the pump to one or more other pumps.

\* \* \* \* \*